(12) United States Patent
Koike et al.

(10) Patent No.: US 7,533,904 B2
(45) Date of Patent: May 19, 2009

(54) SADDLE-RIDING TYPE VEHICLE WITH FUEL PUMP

(75) Inventors: Munetaka Koike, Shizuoka (JP); Katsuhisa Abe, Shizuoka (JP); Takushirou Shiraishi, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 351 days.

(21) Appl. No.: 11/479,941

(22) Filed: Jun. 30, 2006

(65) Prior Publication Data
US 2007/0023218 A1 Feb. 1, 2007

(30) Foreign Application Priority Data

| Jul. 5, 2005 | (JP) | ............................. 2005-196861 |
| Sep. 9, 2005 | (JP) | ............................. 2005-261460 |
| Oct. 3, 2005 | (JP) | ............................. 2005-289725 |

(51) Int. Cl.
*B60P 3/22* (2006.01)
(52) U.S. Cl. ..................... 280/834; 280/833; 280/835
(58) Field of Classification Search ................. 280/834, 280/833, 835, 219
See application file for complete search history.

(56) References Cited
U.S. PATENT DOCUMENTS

| 4,717,163 A * | 1/1988 | Tsukiji ....................... 280/835 |
| 4,799,569 A * | 1/1989 | Hattori et al. ............... 180/219 |
| 4,951,699 A * | 8/1990 | Lipman ...................... 137/142 |
| 5,078,169 A * | 1/1992 | Scheurenbrand et al. .... 137/574 |
| D331,377 S * | 12/1992 | Gevert ....................... D12/218 |
| 5,458,373 A * | 10/1995 | Scheurenbrand et al. .... 280/834 |
| 5,797,377 A * | 8/1998 | Fischerkeller ............... 123/514 |
| 5,944,216 A * | 8/1999 | Inaoka et al. ............... 220/562 |
| 6,655,363 B2 * | 12/2003 | Kobayashi et al. .......... 123/509 |
| 7,040,298 B2 * | 5/2006 | Nakamura et al. .......... 123/509 |
| 7,410,191 B2 * | 8/2008 | Karube et al. ............... 280/833 |
| 2003/0201637 A1 * | 10/2003 | Bergman ..................... 280/834 |
| 2007/0216151 A1 * | 9/2007 | Asamura et al. ............ 280/833 |

FOREIGN PATENT DOCUMENTS

JP 2002-106440 4/2002

* cited by examiner

*Primary Examiner*—Paul N Dickson
*Assistant Examiner*—Tashiana Adams
(74) *Attorney, Agent, or Firm*—Hogan & Hartson LLP

(57) ABSTRACT

A fuel pump for a vehicle is resistant to damage and effectively uses fuel in a fuel tank. The fuel tank is saddle-shaped and straddles an upper side frame section of the vehicle. A left side tank section extends downward on a left side of the upper side frame section and a right side tank section extends downward on a right side. A fuel pump in the interior of the fuel tank is fixed on the bottom surface of either the left or right side tank section. For off-road saddle-riding type vehicles, the fuel pump is provided anterior to a fuel tank central portion when viewed from a side of the vehicle to ensure easy handling and foot landing properties.

11 Claims, 29 Drawing Sheets

[Figure 1]
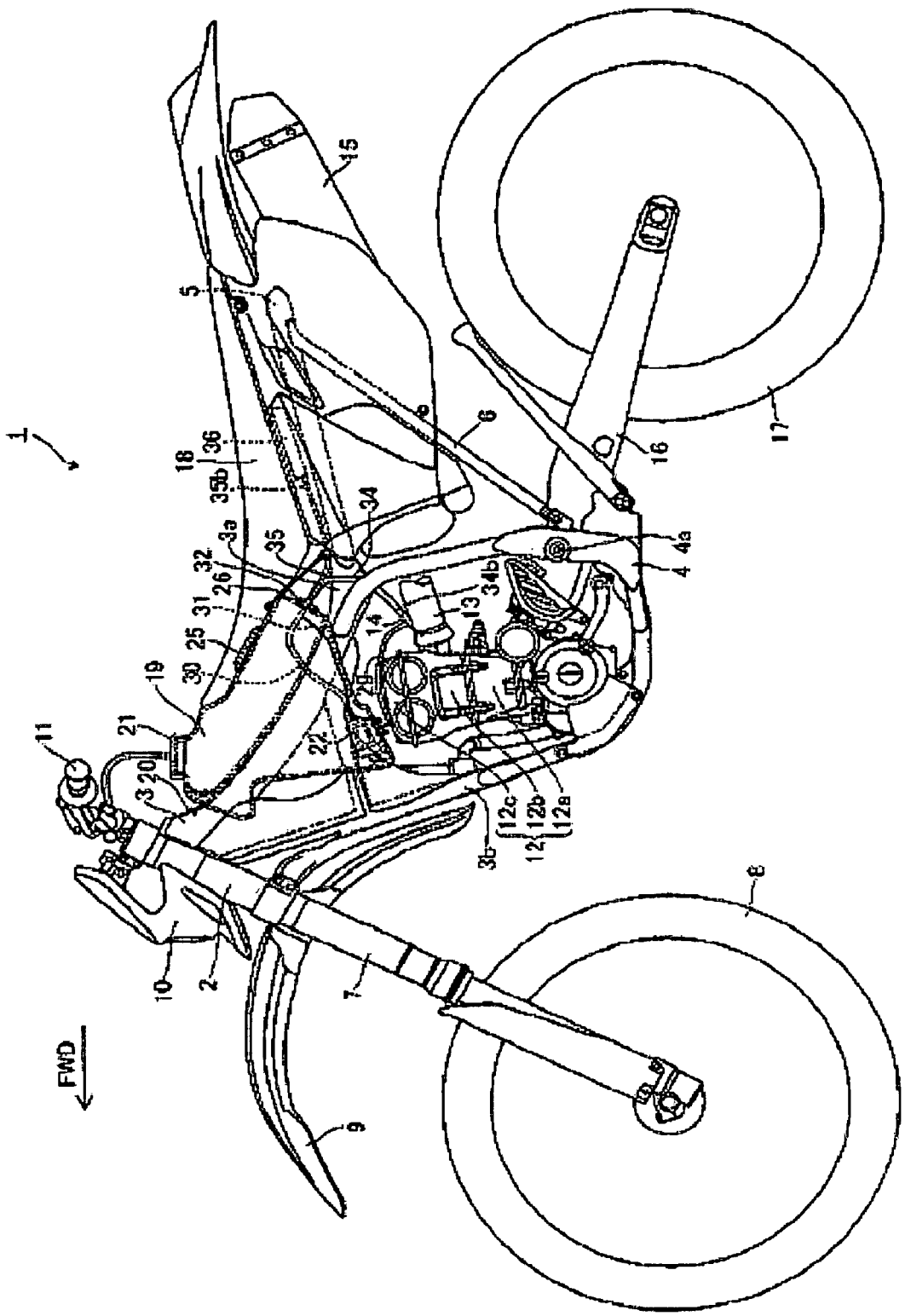

[Figure 2]
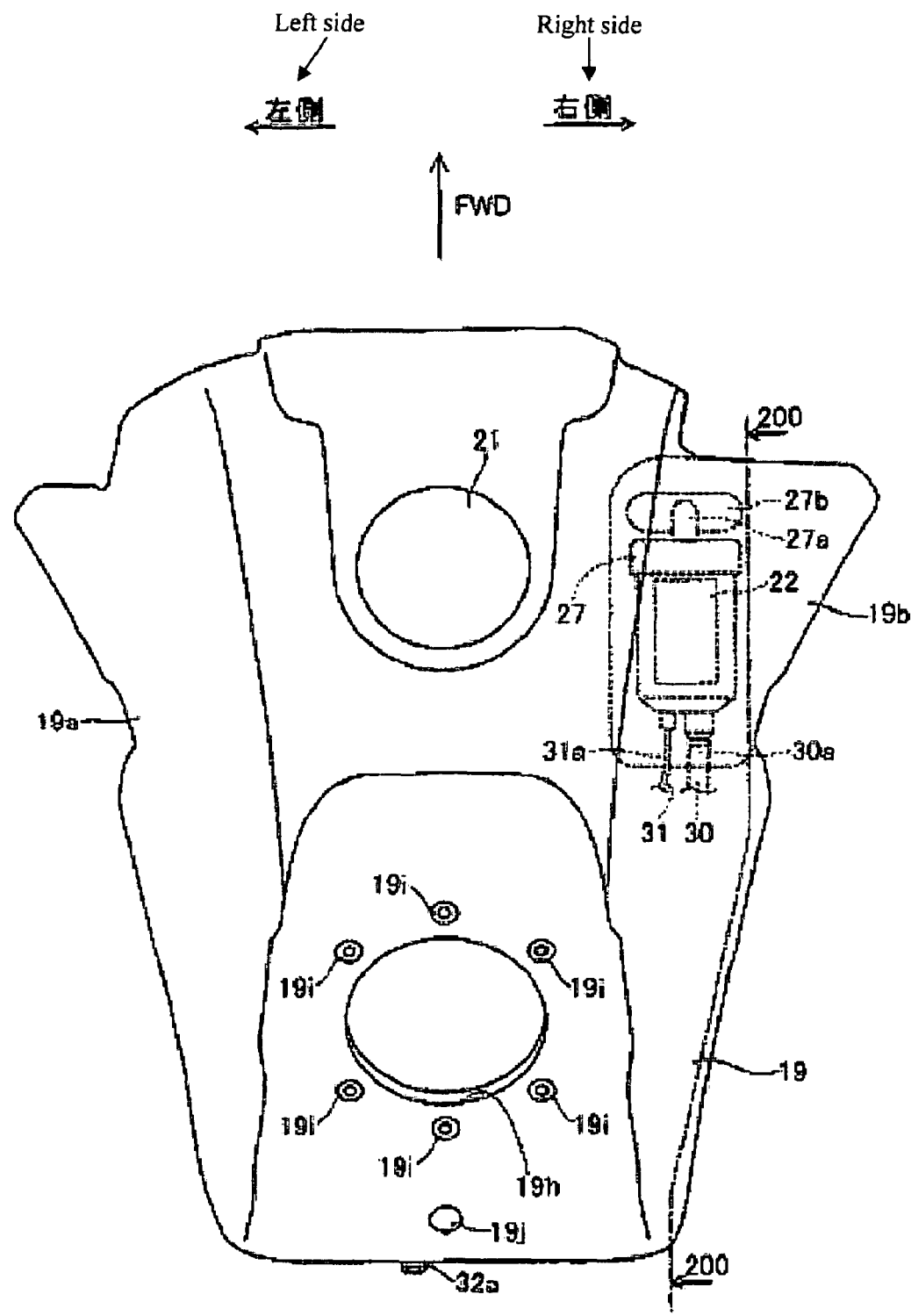

[Figure 3]
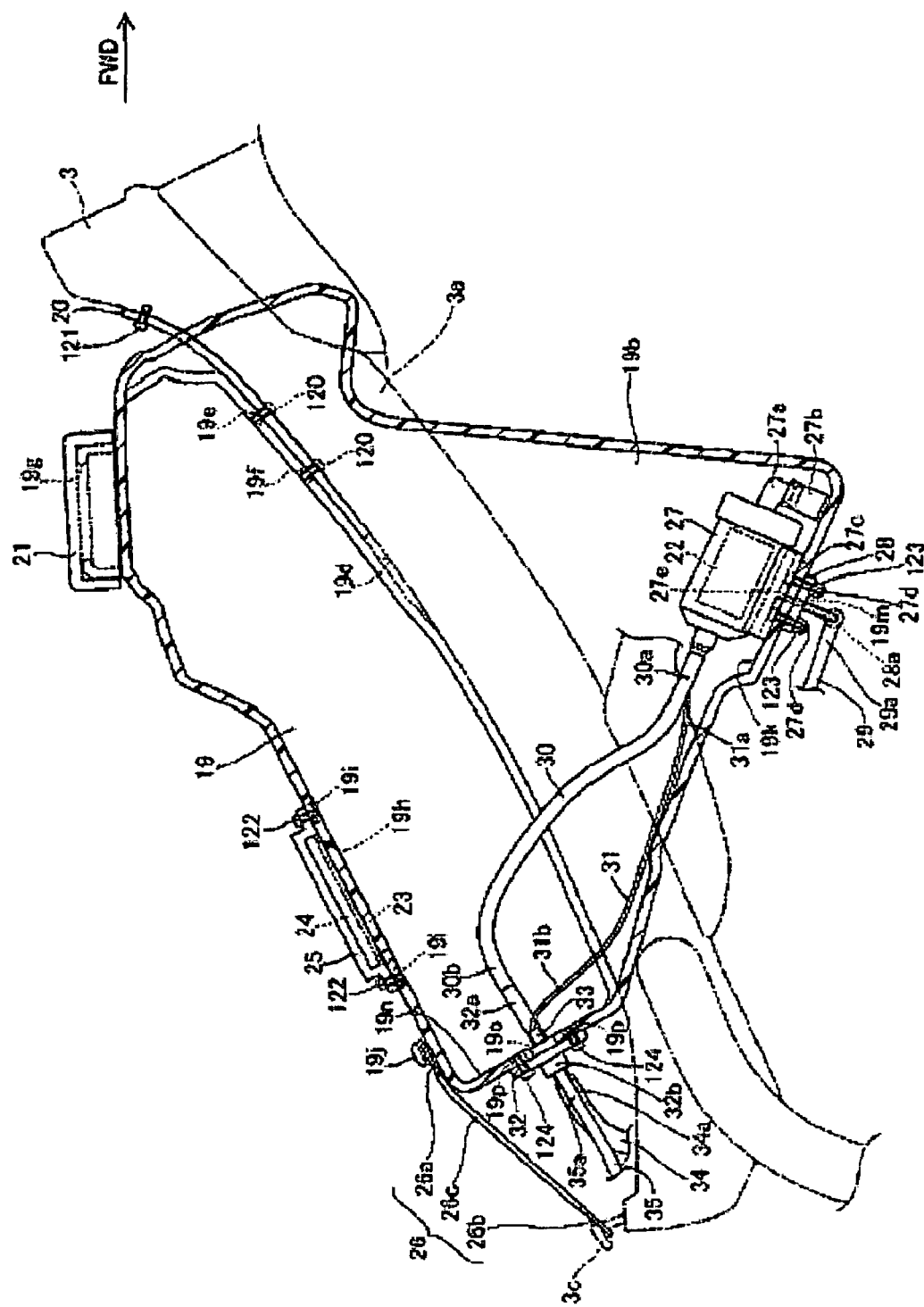

[Figure 4]
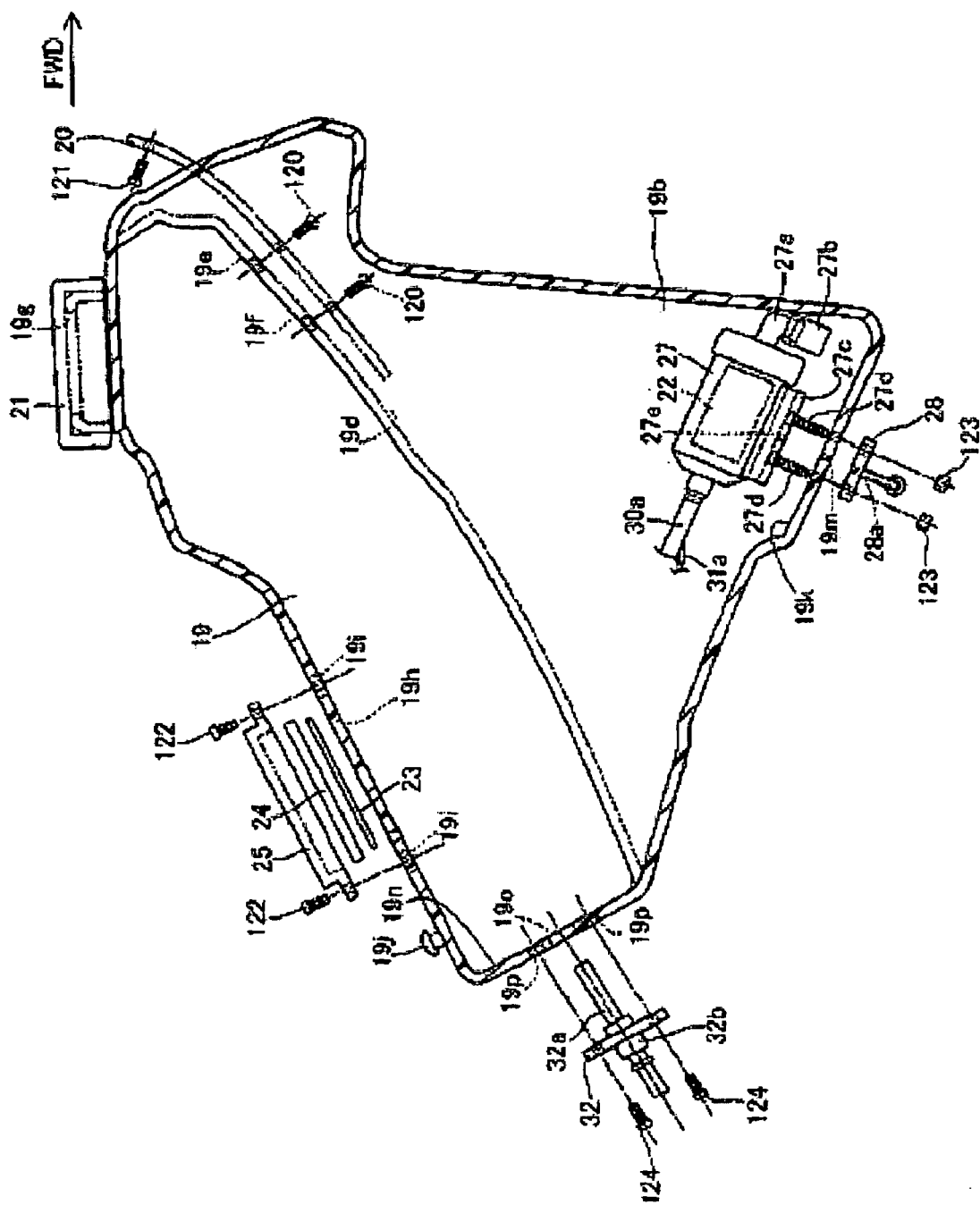

[Figure 5]
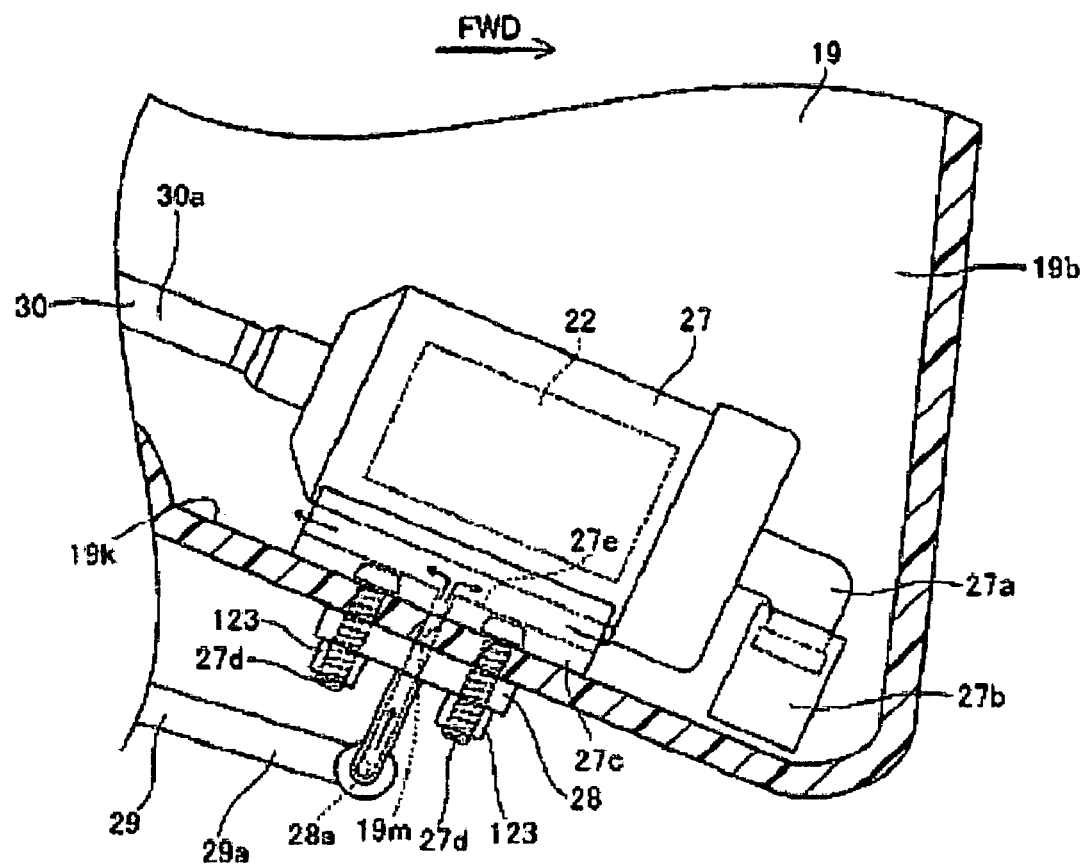

[Figure 6]
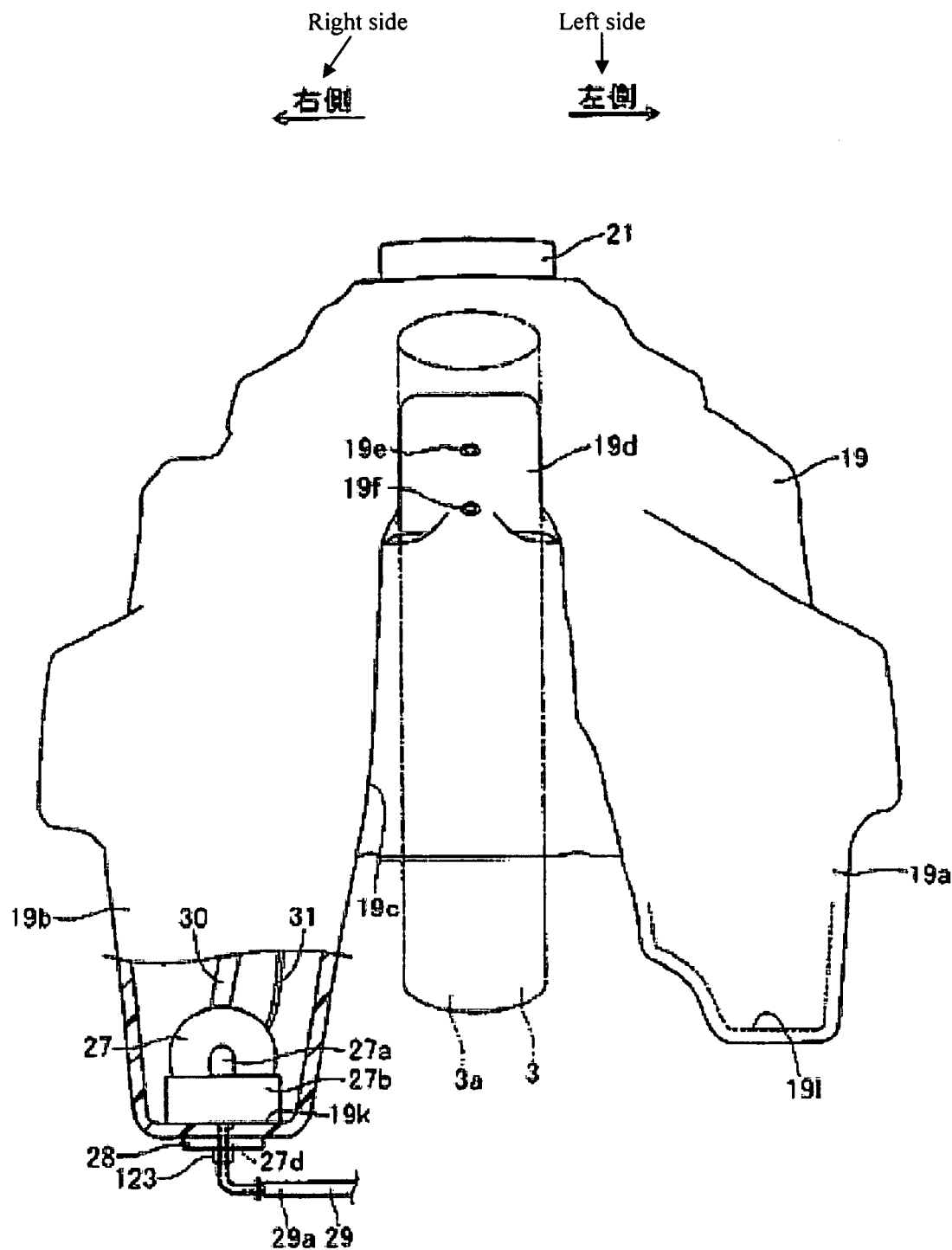

[Figure 7]
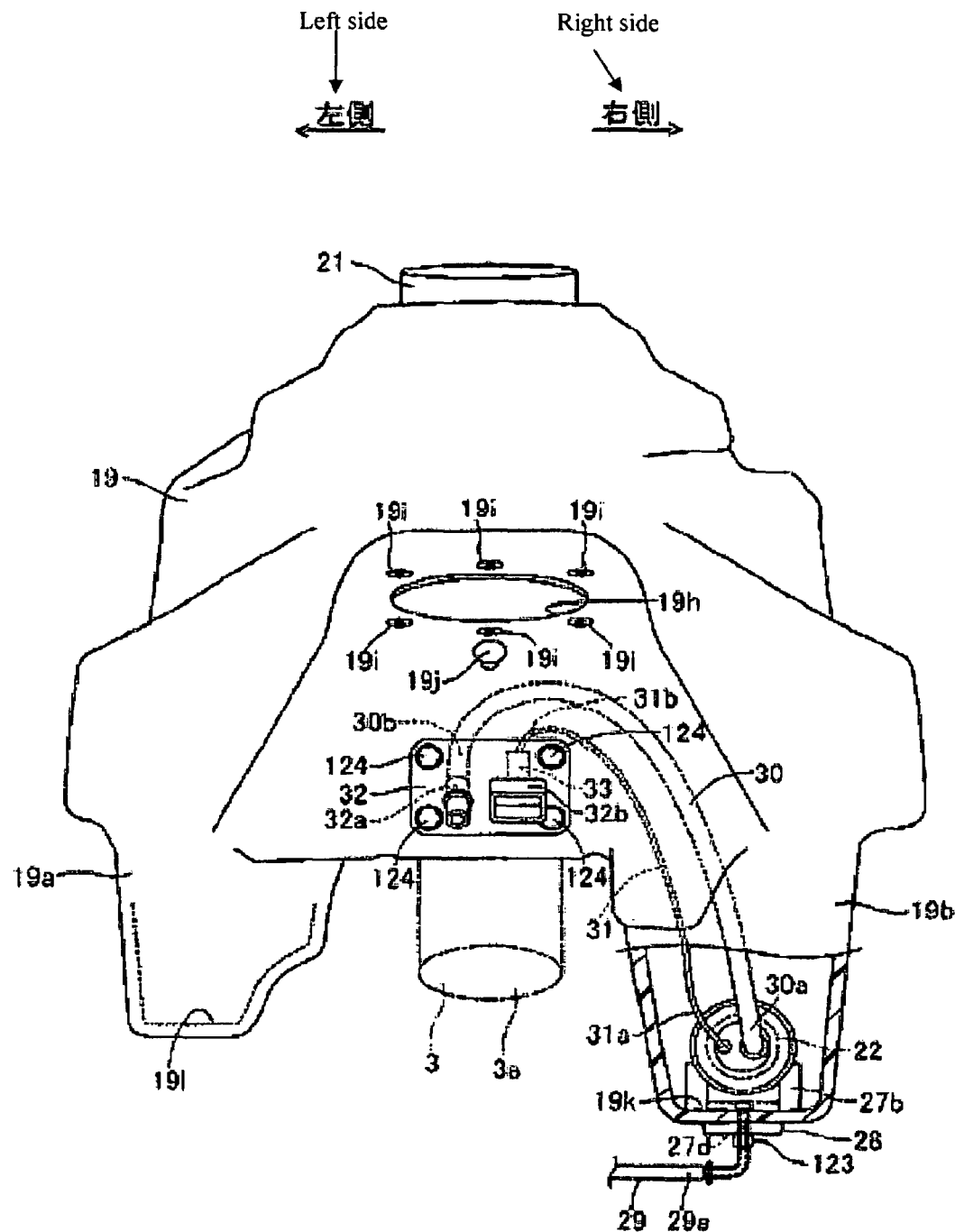

[Figure 8]
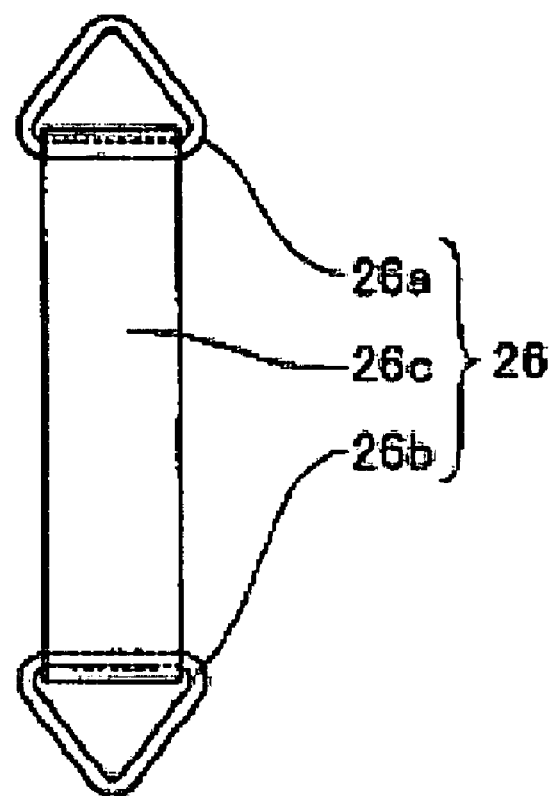

[Figure 9]
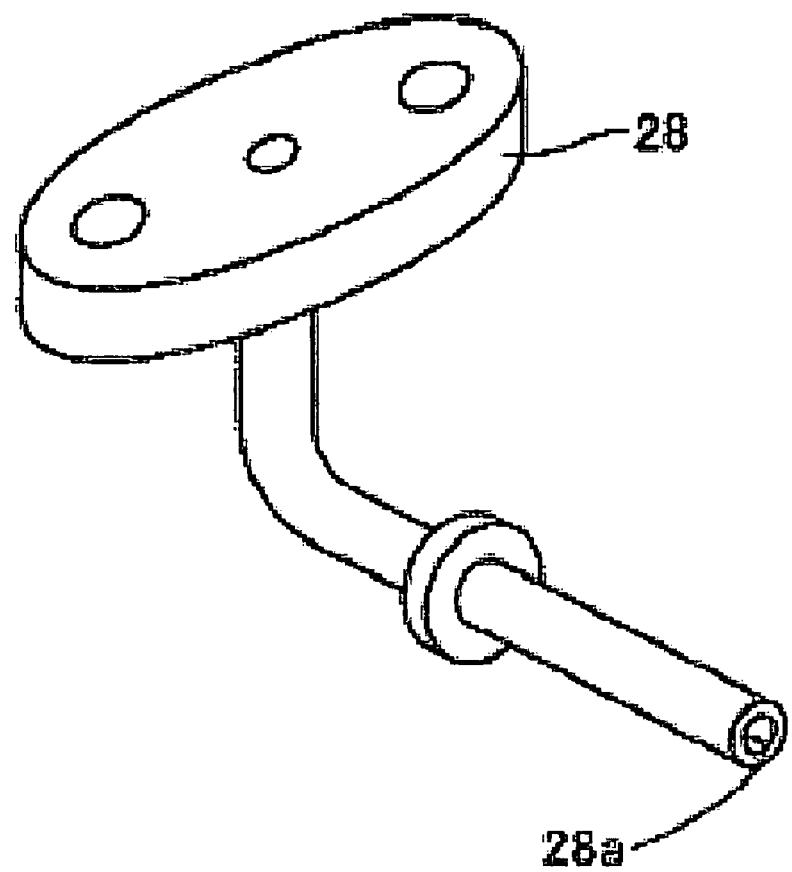

[Figure 10]
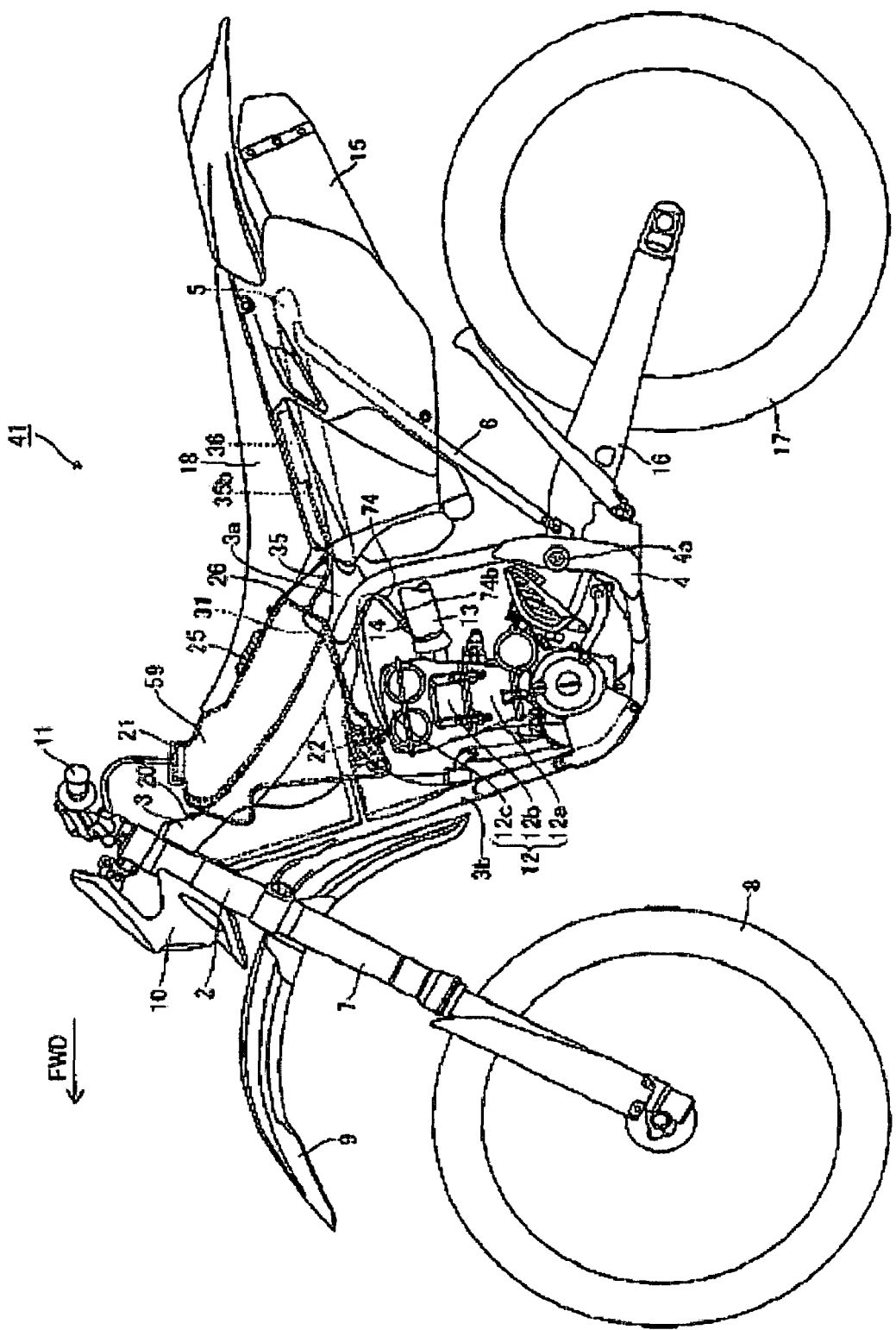

[Figure 11]
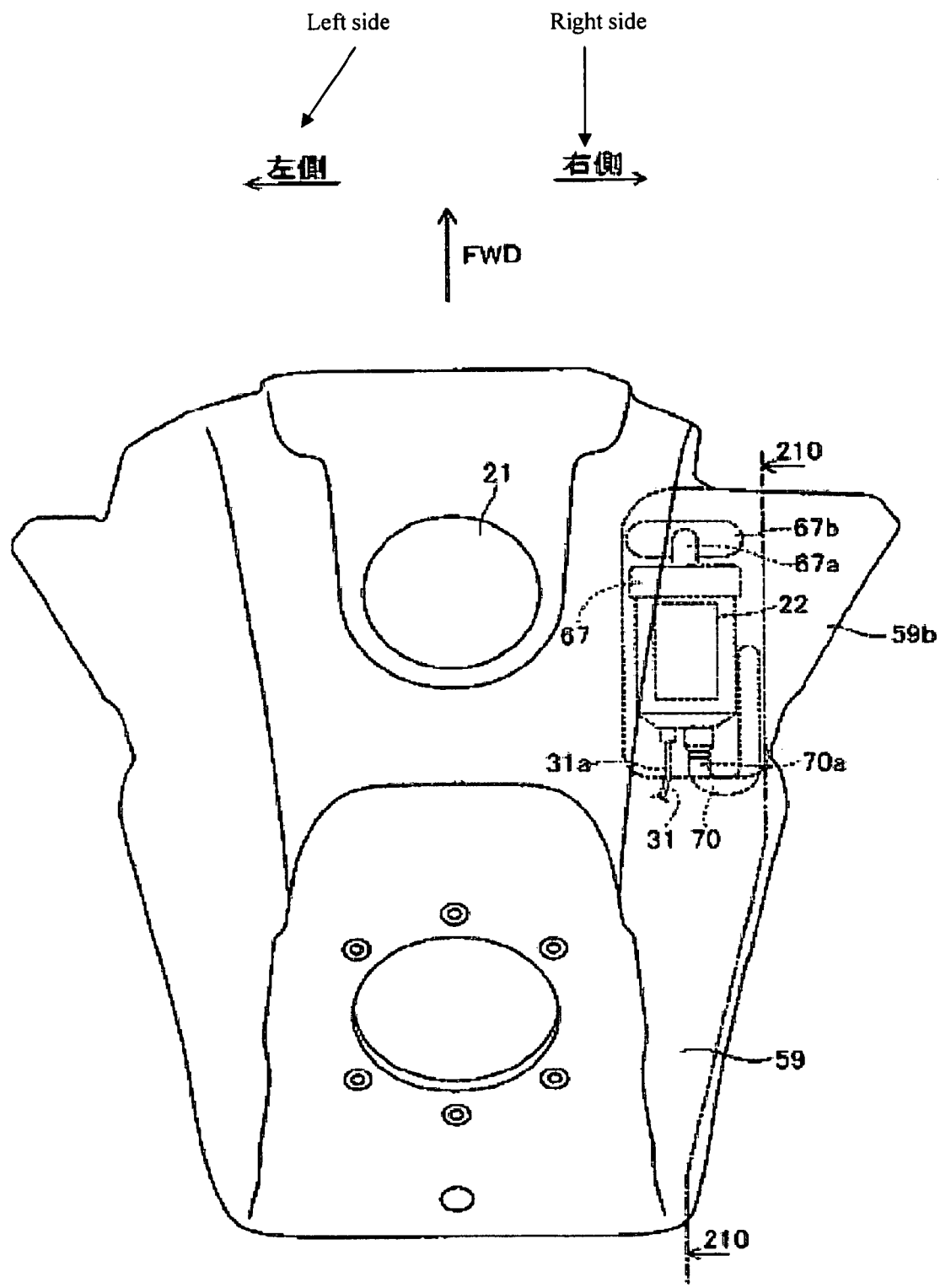

[Figure 12]
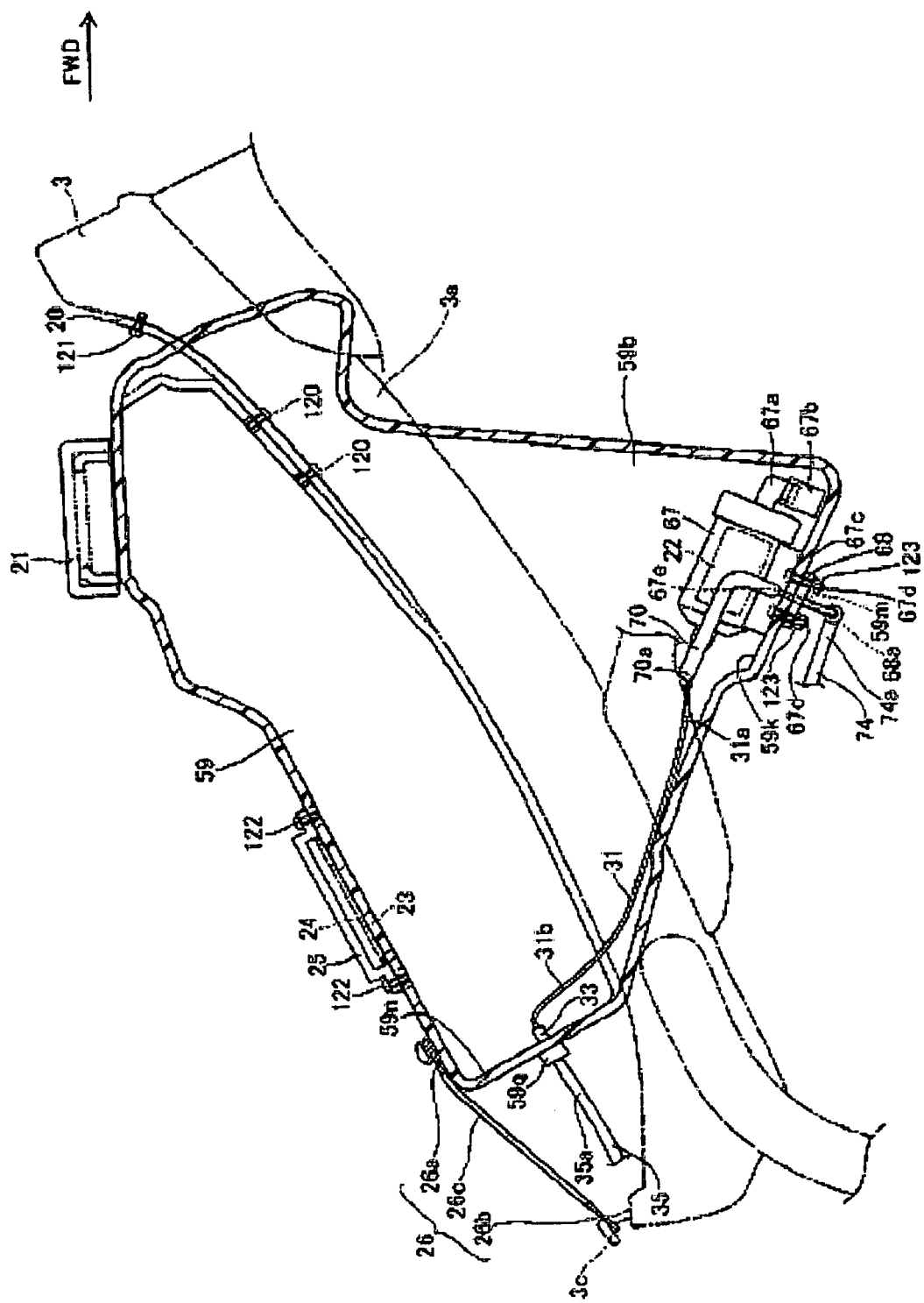

[Figure 13]
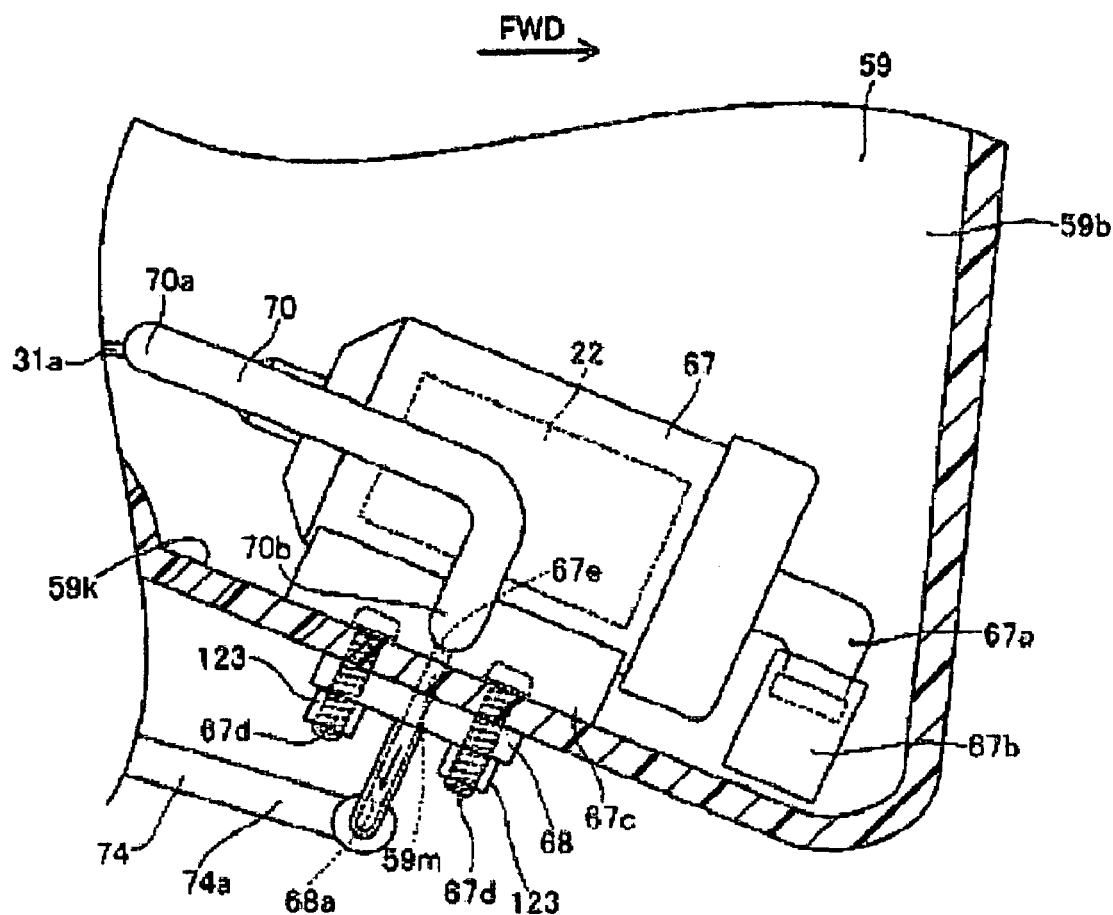

[Figure 14]
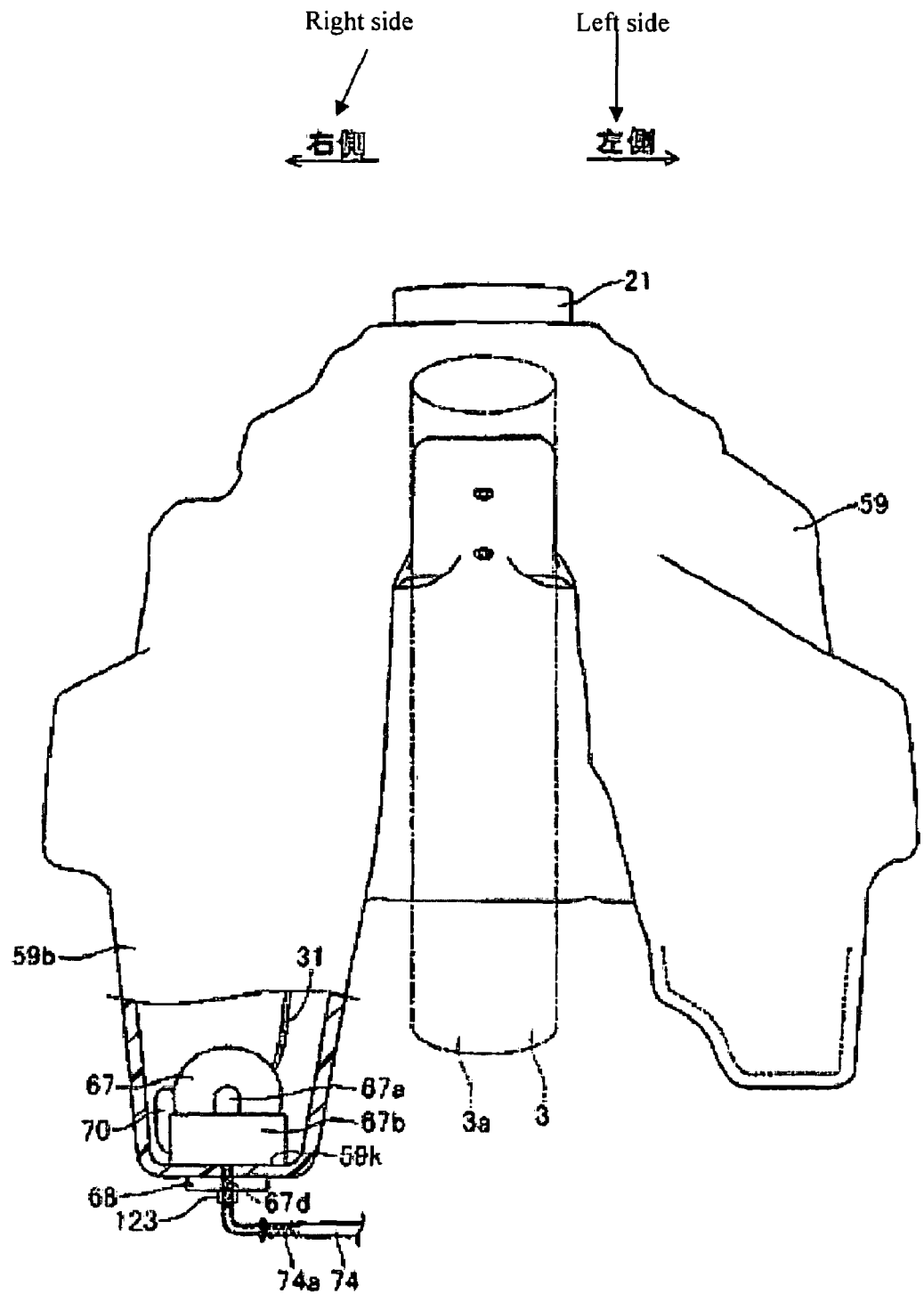

[Figure 15]
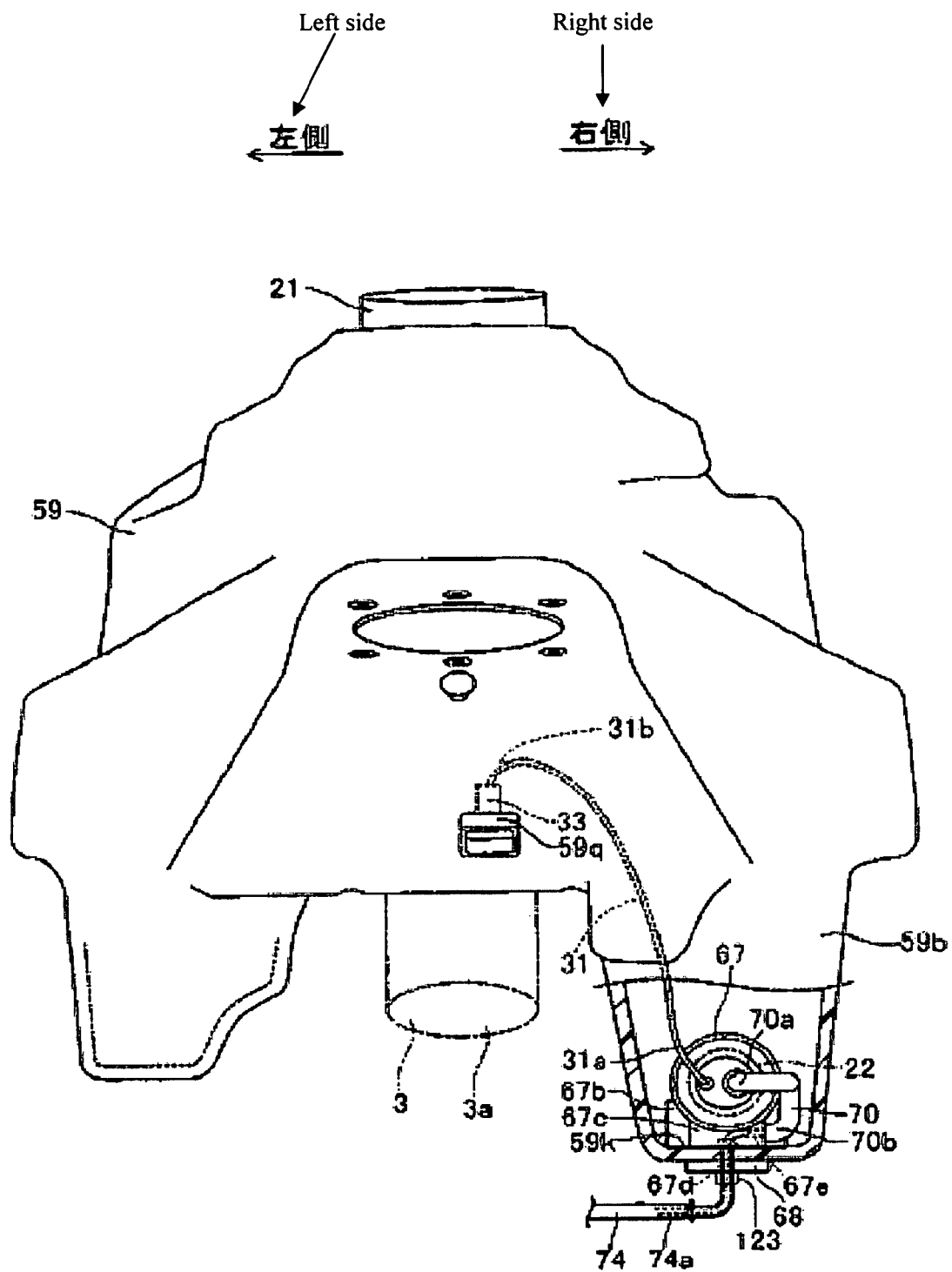

[Figure 16]
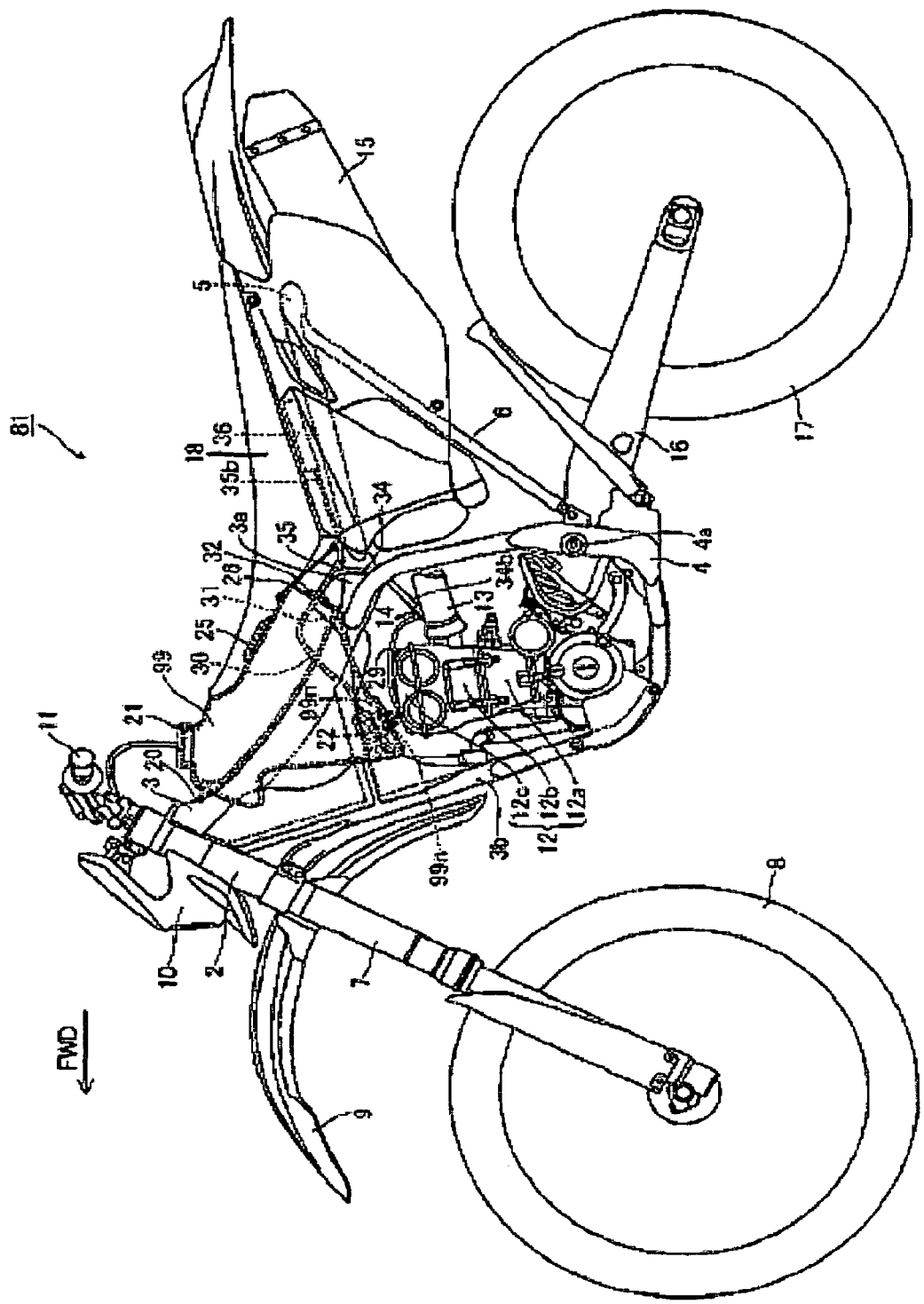

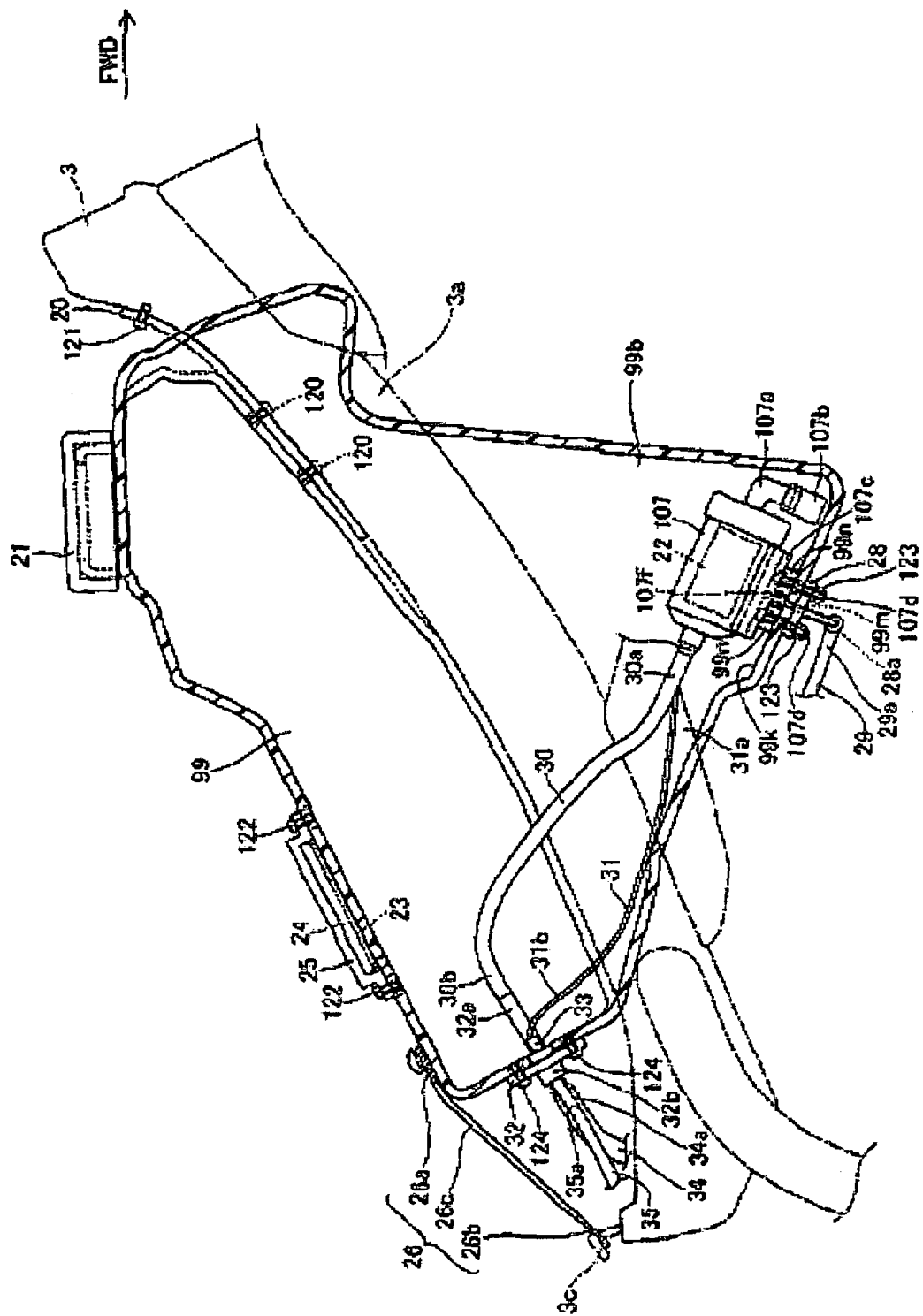
[Figure 17]

[Figure 18]
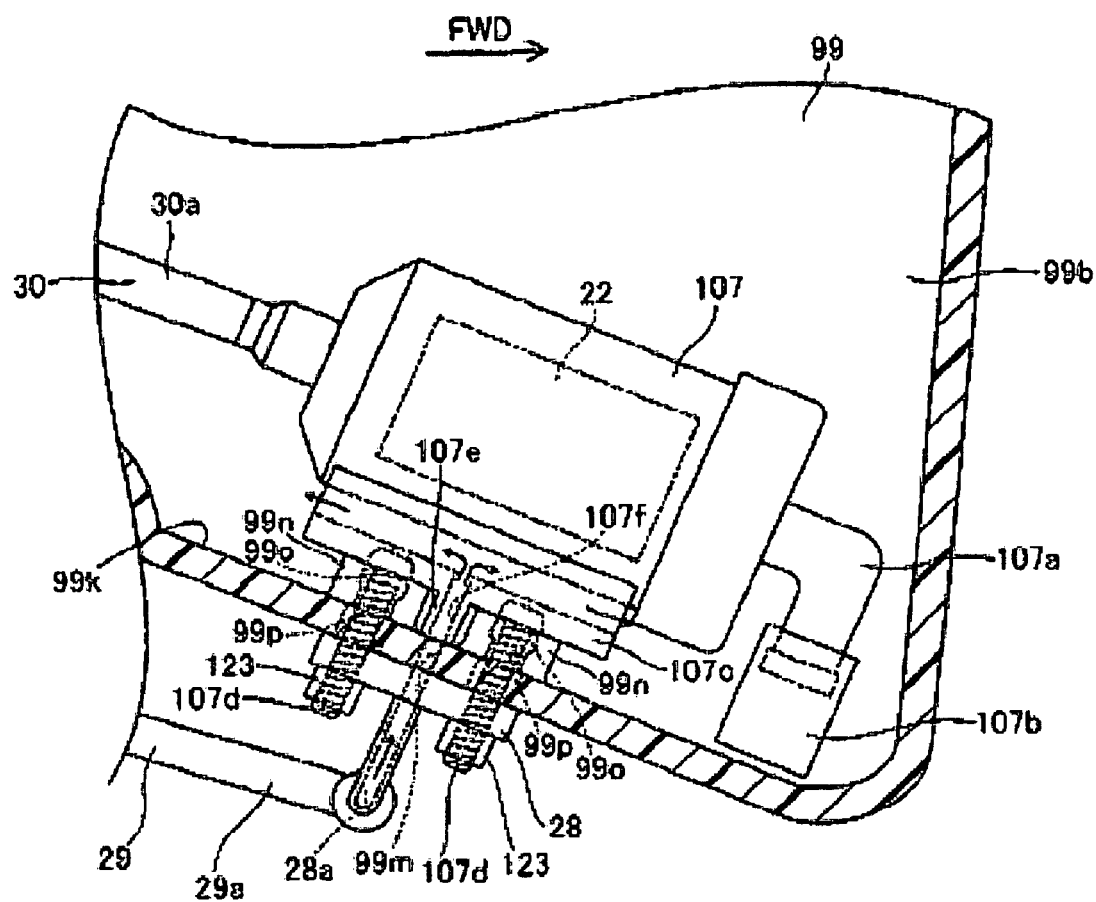

[Figure 19]
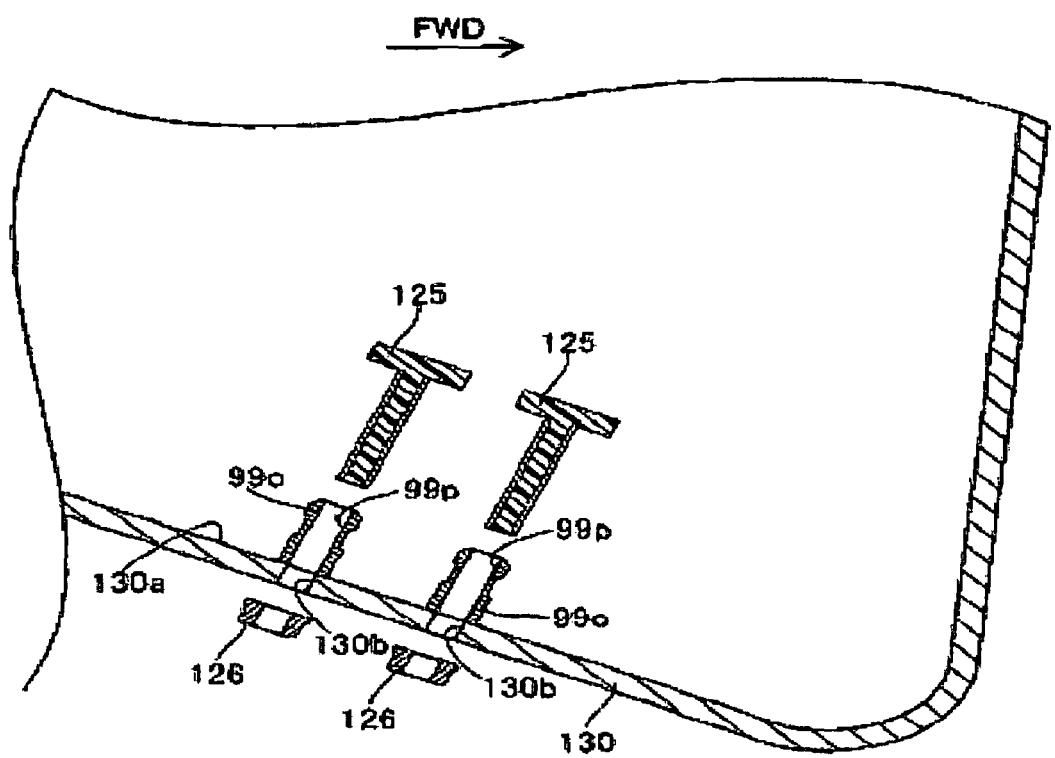

[Figure 20]
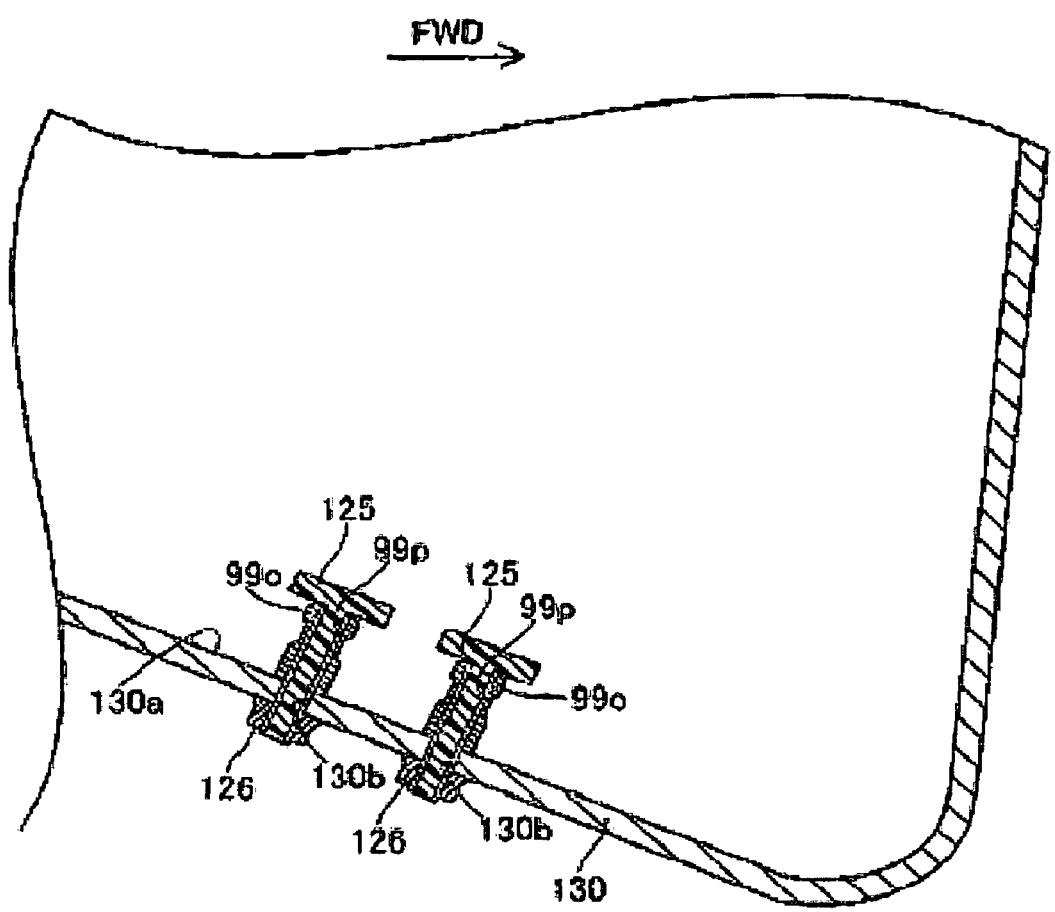

[Figure 21]
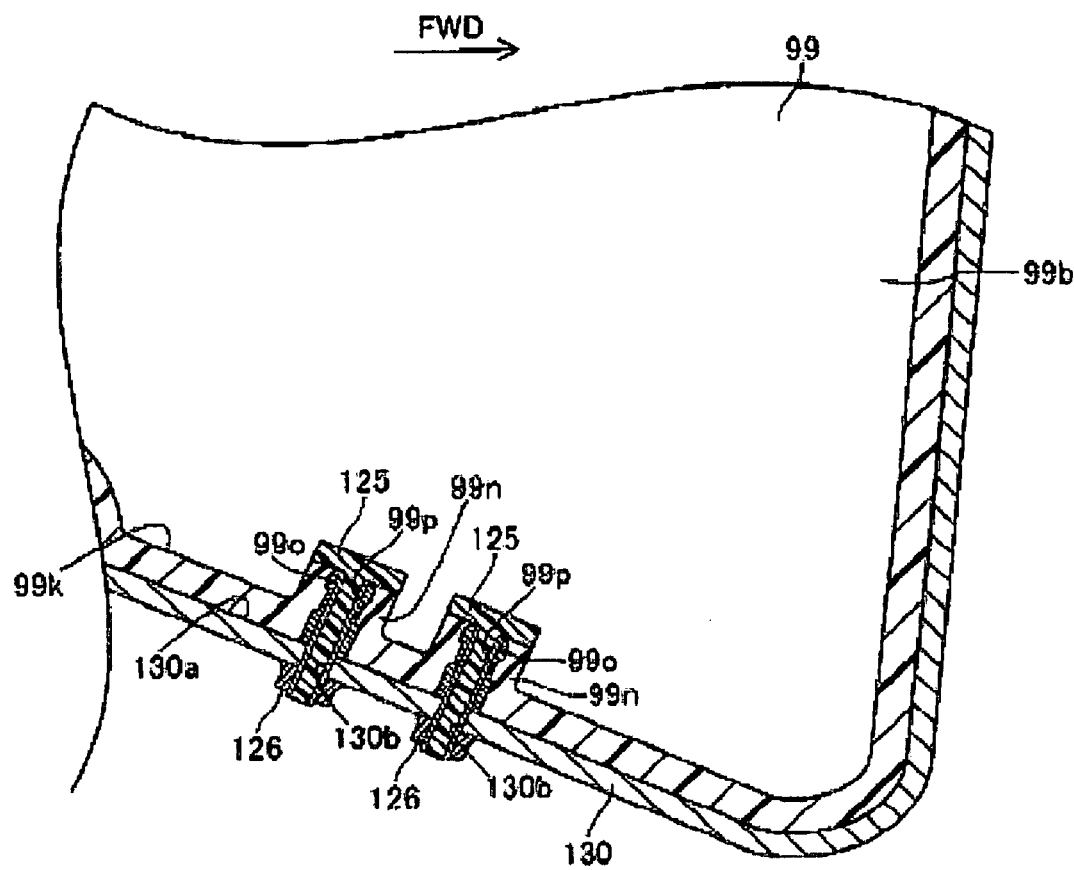

[Figure 22]
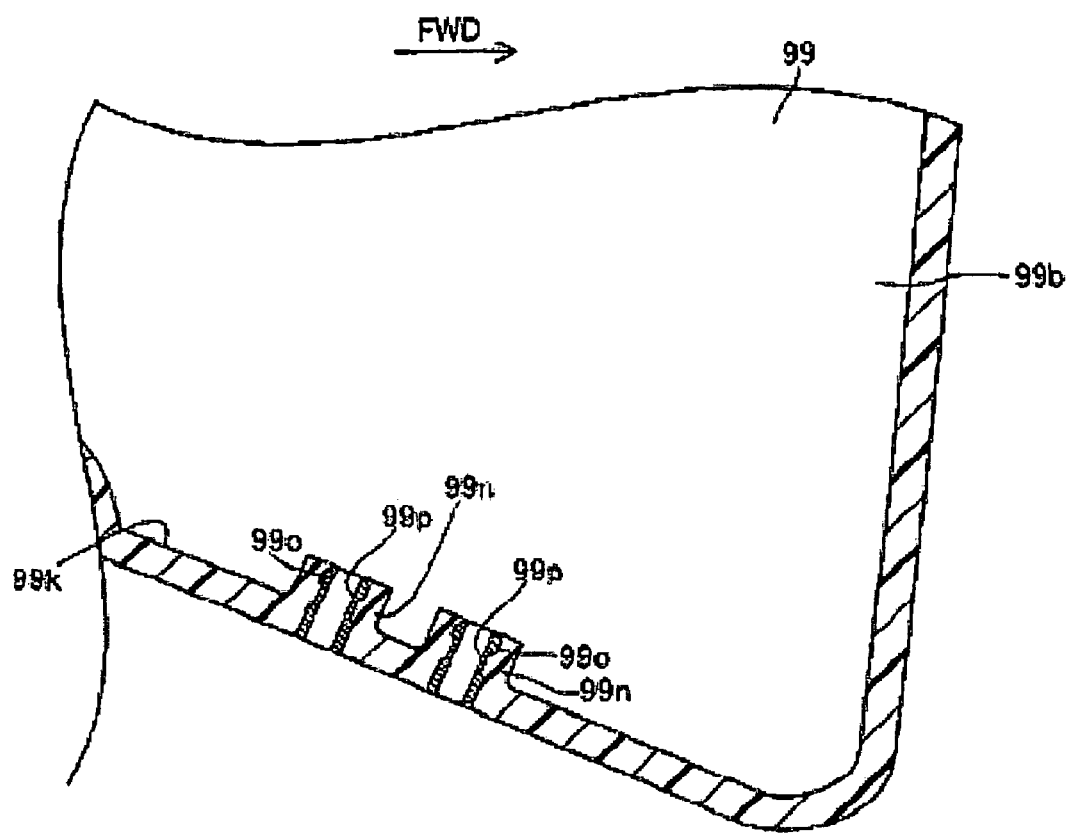

[Figure 23]
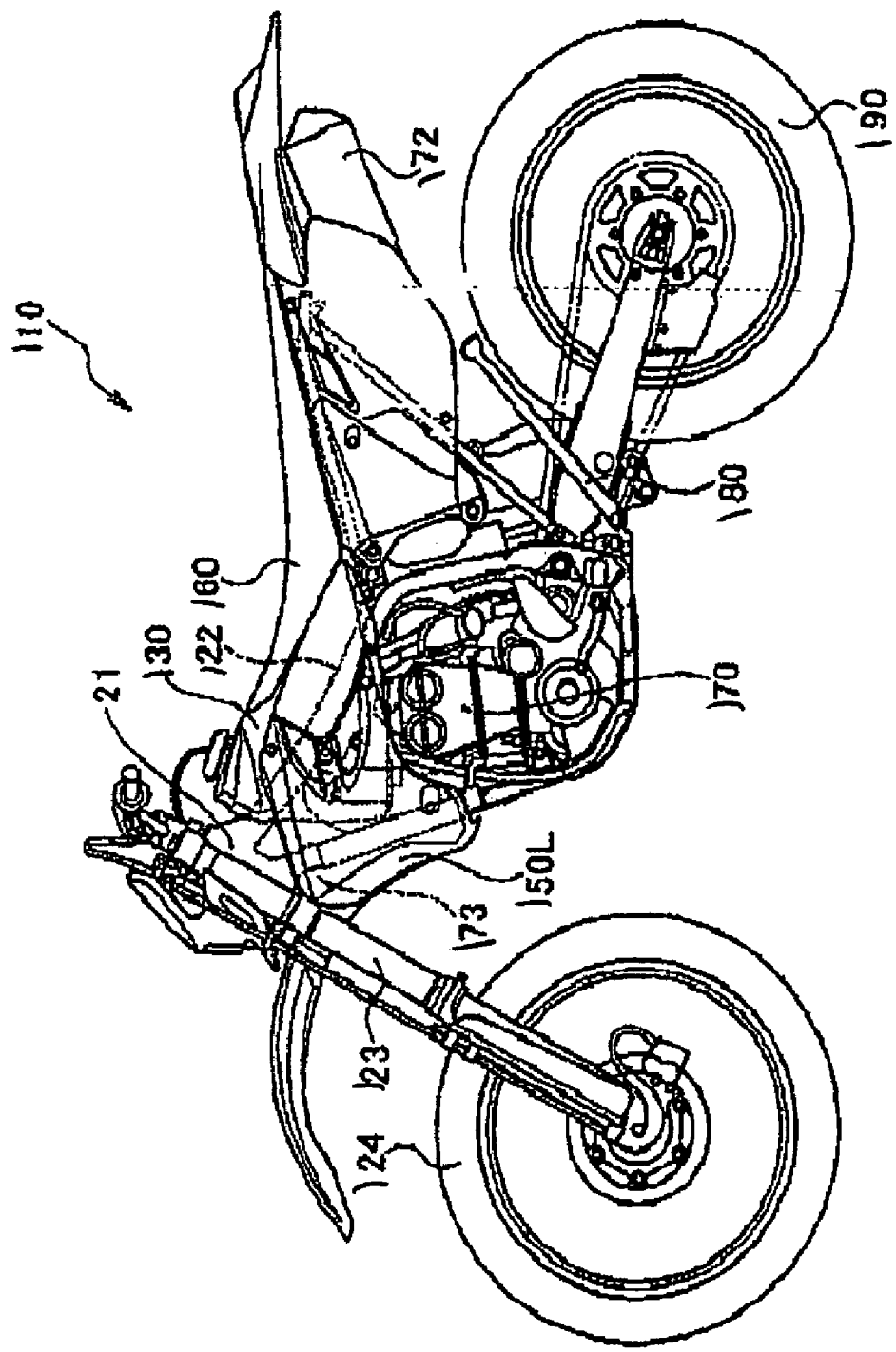

[Figure 24]
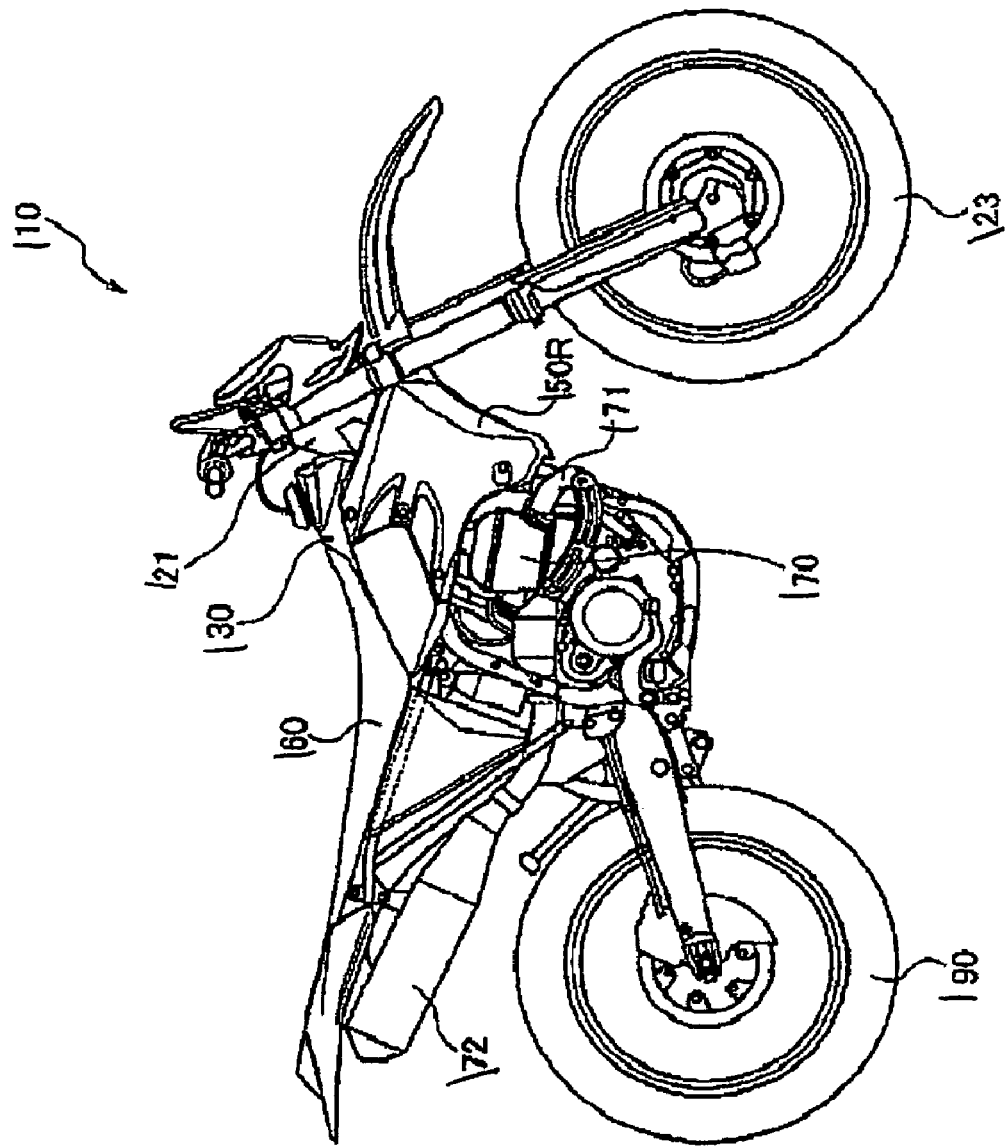

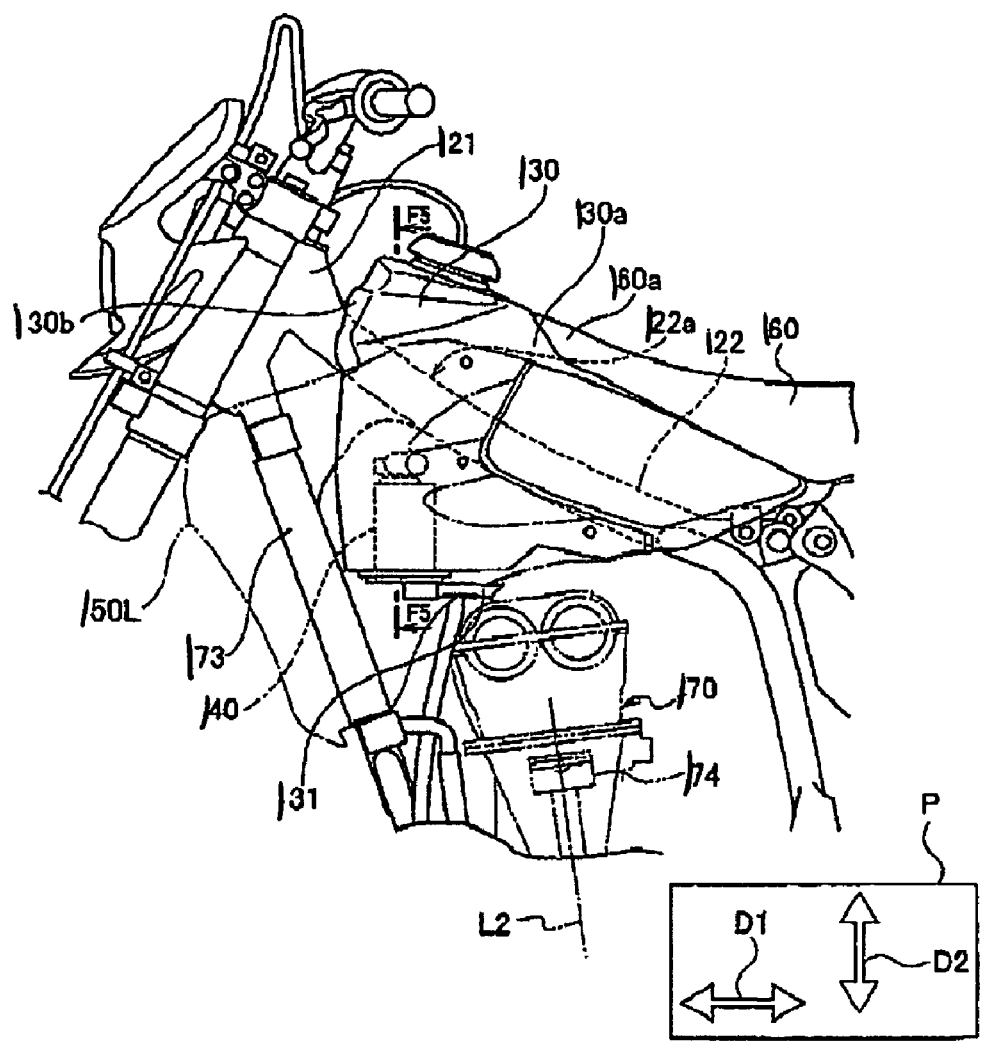
[Figure 25]

[Figure 26]
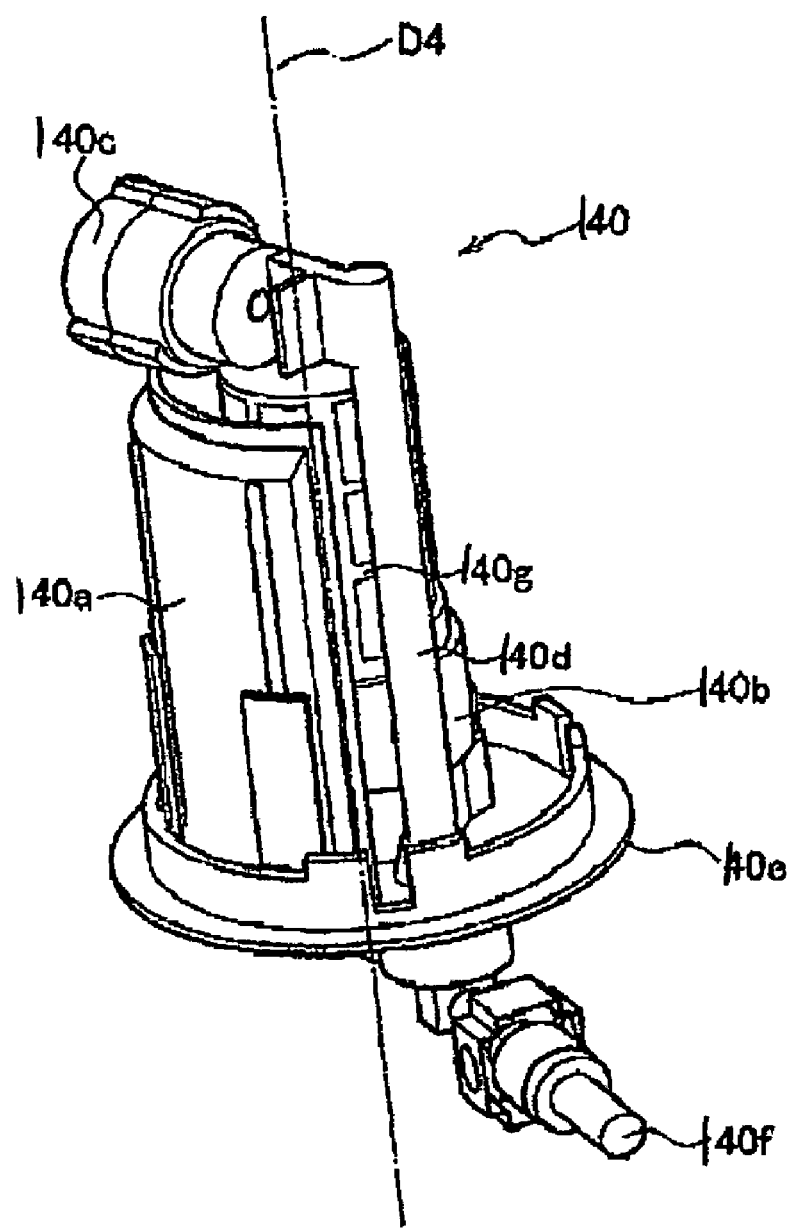

[Figure 27]
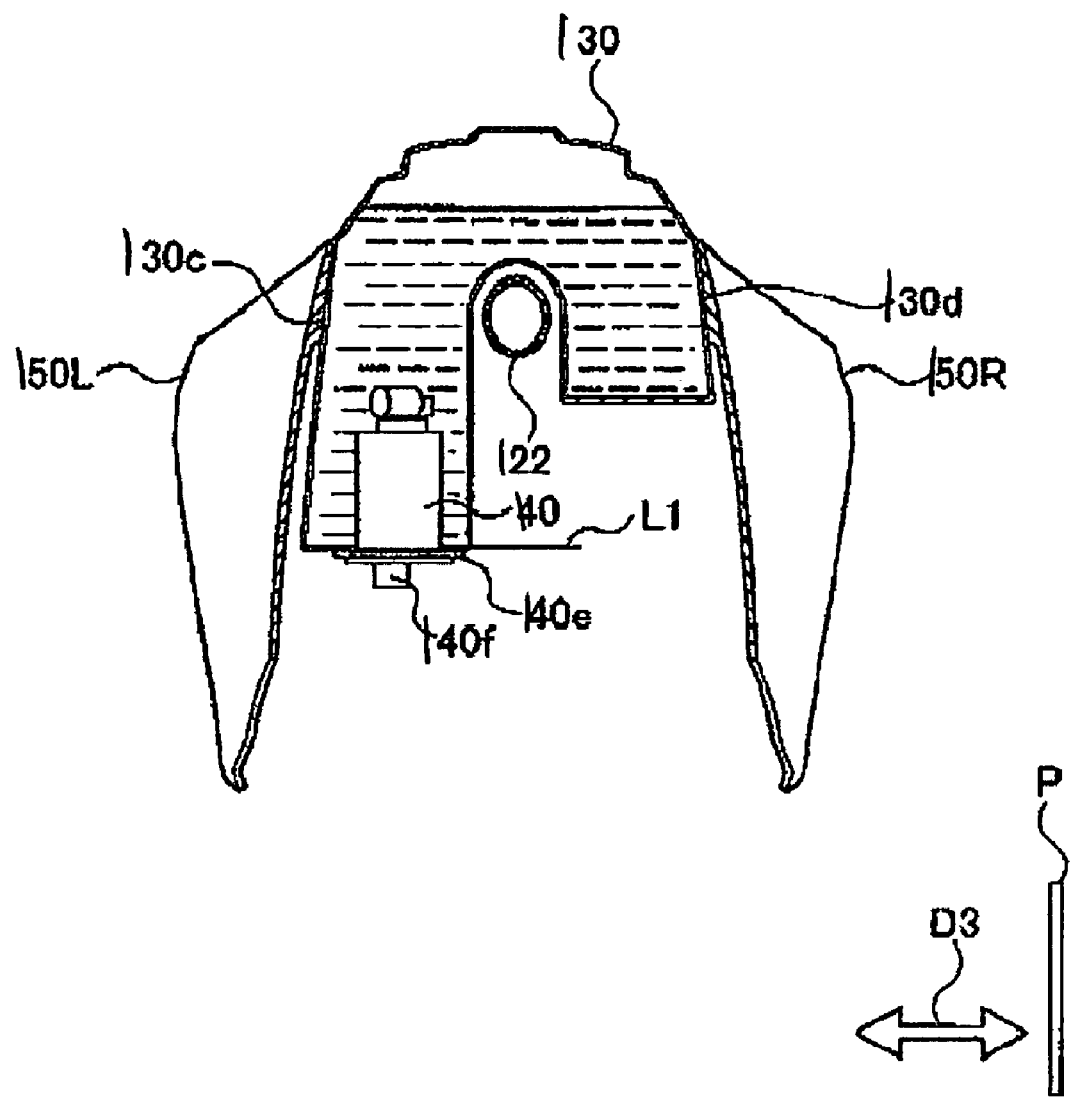

[Figure 28]
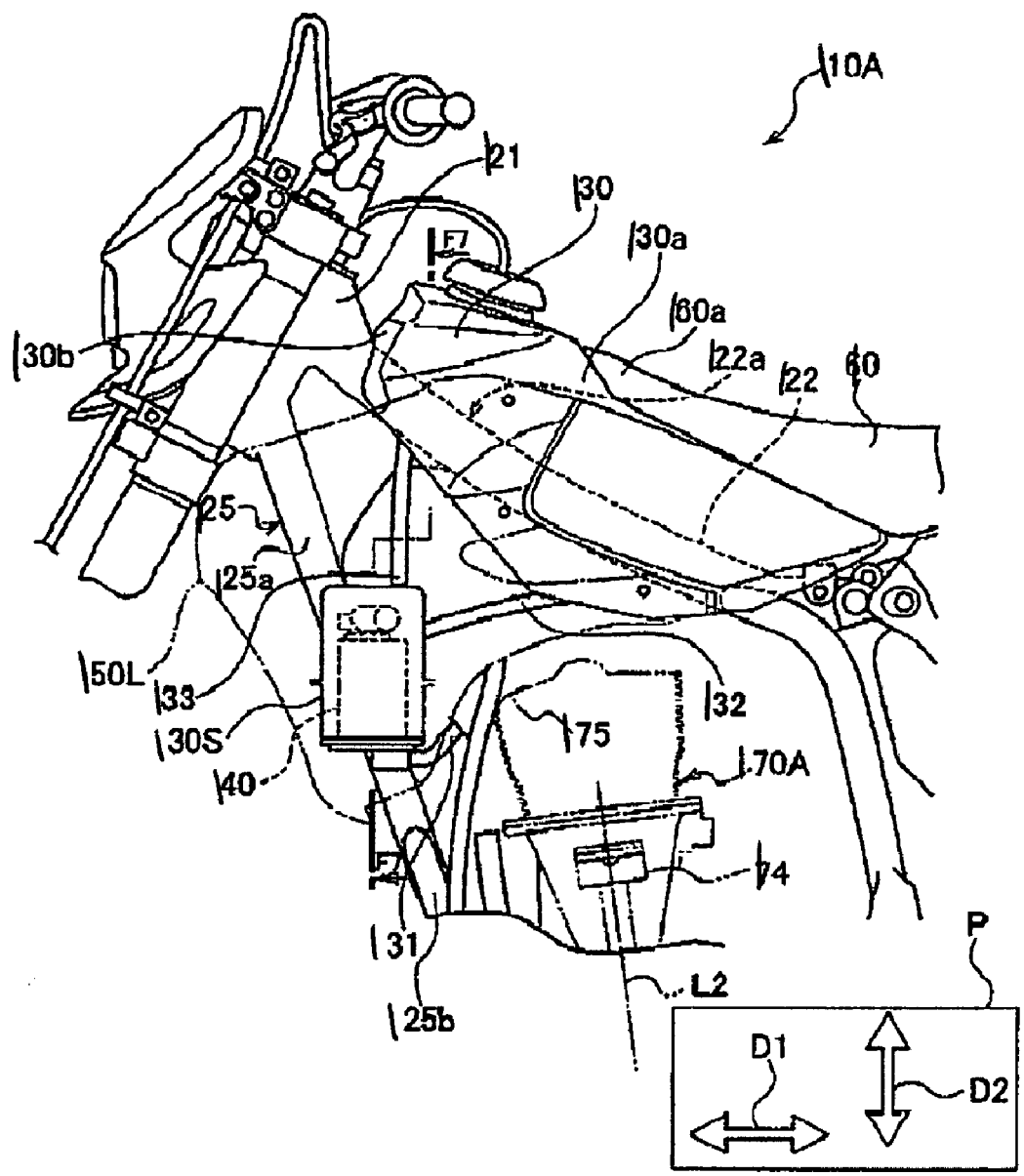

[Figure 29]
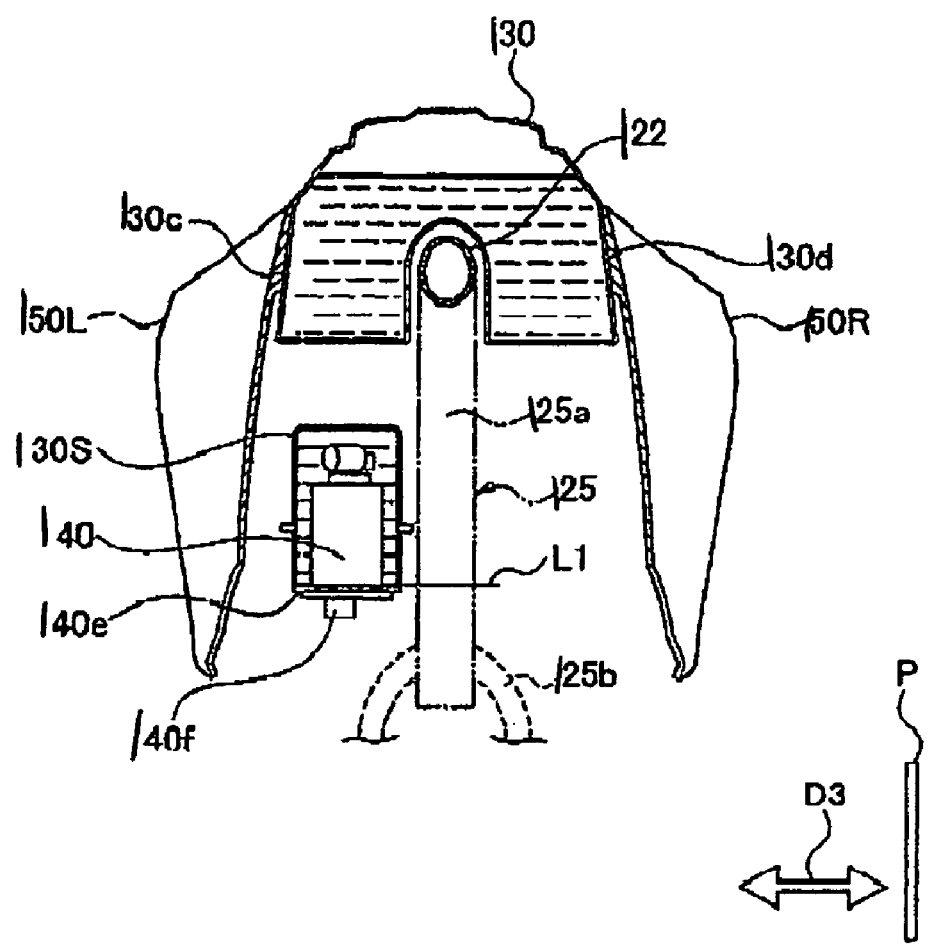

SADDLE-RIDING TYPE VEHICLE WITH FUEL PUMP

BACKGROUND OF THE INVENTION

1. Field of the Invention

The present invention pertains to saddle-riding type vehicles and, in particular, to a saddle-riding type vehicle that is equipped with a fuel pump for supply of fuel to an internal combustion engine.

2. Description of Related Art

A saddle-riding type vehicle such as a two-wheeled motor vehicle equipped with a fuel pump is conventionally known. In Japanese Laid Open Patent Application Publication 2002-106440, for example, a two-wheeled motor vehicle is equipped with a fuel tank having a saddle shape. A strainer (filtering apparatus) is fixed on a base plate on the upper surface of the fuel tank. The strainer is connected to a hose and the hose is connected to a fuel pump. The fuel pump, which supplies fuel to an electronically controlled fuel injection apparatus (injector), is situated inside a rear portion of the fuel tank, and is not fixed.

Because the fuel pump is not fixed, it may collide with the inner surface of the fuel tank during travel and the like and be damaged. Furthermore, the fuel pump may move upward in the fuel tank. In this case, when there is little fuel left in the tank it is not easily sucked into the pump, making it difficult to effectively use the fuel.

With respect to two-wheeled motor vehicles configured for off-road use such as Motocross and Enduro, carburetors are usually employed rather than a fuel injection apparatus. Nevertheless, use of an electronically controlled fuel injection apparatus has been studied in two-wheeled motor vehicles for off-road use. In such off-road vehicles, easy handling and foot landing properties are critical factors. When a fuel pump is conventionally situated inside the rear portion of a fuel tank, however, the size of the fuel tank becomes larger in the proximity of the seat. Because a rider of an off-road saddle-type riding vehicle must move his body significantly upward and downward, and forward and backward, easy handling and foot landing properties are compromised by the larger tank in the proximity of the seat.

SUMMARY OF THE INVENTION

The present invention resolves these issues. First, second and third embodiments of the invention are described that prevent damage to the fuel pump and effectively uses the fuel in the fuel tank. Fourth and fifth embodiments of the invention are described that provide an saddle-riding type off road vehicle that is equipped with a fuel pump and still ensures easy handling and foot landing properties. Properties and features of all embodiments, of course, may be combined and/or omitted as appropriate.

In first, second and third embodiments of the invention, a vehicle is equipped with a frame extending in a front and rear direction. A fuel tank has a saddle shape and is mounted to and straddles the frame. A left side tank section extends downward on the left side of the frame and faces the travel direction, and a right side tank section extends downward on the right side of the frame and faces the travel direction. A fuel pump is in the interior of the fuel tank and supplies fuel to an engine, and is fixed to the bottom section of either the left or right side tank section. Therefore, the fuel pump does not collide with the inner surface of the fuel tank and become damaged because of vibrations during travel and the like. Moreover, because the fuel pump is fixed to the bottom section of the tank it cannot move upwards in the tank and does not have difficulty in pumping fuel from the tank when the fuel level is low. Preferably, the fuel pump is fixed adjacent to the lowermost portion of the bottom surface of either the left or right side tank section, permitting use of fuel until the tank is almost empty.

The bottom surface of the tank preferably slopes downward towards the front of the tank, with the fuel pump being fixed adjacent the front edge of the bottom surface of the tank. Thus, the fuel pump is fixed to the lowermost portion of the bottom surface of the tank. If the heights of the bottom surfaces of the left and right side tank sections are different, that is, if the bottom surface of one of the sections is lower than the other section, the fuel pump is preferably fixed to the bottom surface of the tank section that is the lowest.

The vehicle is preferably equipped with electrical wiring having one end connected to the fuel pump. An interior connector member on the other end of the wiring is connected to an exterior connector member that is situated in the rear portion of the fuel tank a predetermined distance from the fuel pump. Preferably, to reduce the number of parts, the exterior connector member is integrally formed with the fuel tank. Since the fuel pump is situated in the bottom of the fuel tank, and the fuel tank has a saddle shape that becomes narrower towards the bottom, the fuel pump, interior connecter member and exterior connecter member can be arranged with predetermined distances, making it easier to configure the fuel pump in the narrow bottom section of the fuel tank.

Preferably, a sealing member is mounted on a flat surface section in the rear portion of the fuel tank and seals the space between the fuel tank and at least either of the interior connector member and the exterior connector member, and is mounted in a flat surface section in the rear portion of the fuel tank. This provides a better seal than a case where the sealing member is mounted on a concave or convex surface of the tank.

A first piping member preferably supplies fuel to the outside of the fuel tank. A sealing member, which includes the exterior connector member and a piping member connection section, is mounted to the rear portion of the fuel tank. One end section of the first piping member is connected to the fuel pump, and the other end section of the first piping member is connected to the piping member connection section of the sealing member from the inside of the fuel tank. Fuel passes through the first piping member and is supplied to the outside from the rear portion of the fuel tank. Preferably, to reduce the number of parts, the exterior connector member and piping member connection section are formed integrally with the sealing member.

The vehicle is preferably further equipped with a return piping member for returning fuel to the fuel tank. The return piping member is connected to a first exterior fixing member having a first fuel path section. The first exterior fixing member is fixed to the exterior of the bottom surface of the fuel tank on which the fuel pump is fixed. Fuel passing through the return piping member is returned to the bottom section of the fuel tank via the first fuel path section of the first exterior fixing member. Thus, the returned fuel can be readily sucked in by the fuel pump.

Preferably, the vehicle is also equipped with a first interior fixing member having a second fuel path section. The first interior fixing member mounts the fuel pump to the inside bottom surface of either the left or right side tank section. A second piping member supplies fuel to the outside of the tank. One end section of the second piping member is connected to the fuel pump, and the other end section is connected to the first interior fixing member. Fuel passing through the second piping member is supplied to the outside from the bottom surface of the fuel tank via the second fuel path section of the first interior fixing member. Less pumping power is required relative to configurations where fuel is supplied from the upper portion of tank, thereby permitting a smaller pump size.

A second exterior fixing member is preferably mounted to the outside bottom surface of the fuel tank and has a third fuel path section connected to the second fuel path section of the first interior fixing member. Fuel passing through the second fuel path section of the first interior fixing member is supplied to the outside from the bottom surface of the fuel tank via the third fuel path section of the second exterior fixing member. With this configuration, fuel can easily be supplied from the bottom surface of the fuel tank to the outside.

Boss sections protruding inward are preferably provided on the bottom surface of either the left or right side tank section. A second interior fixing member, which has a predetermined length and to which the fuel pump is mounted, is arranged in the inner side portion of the boss sections. This improves the precision of mounting the fuel pump to the fuel tank relative to instances where the fuel pump is mounted directly on the inner surface of the fuel tank, which may not have excellent flatness. Through holes are preferably provided in the second interior fixing member so that the fuel pump can be easily mounted to the fuel tank with screw bolts and nuts.

The fourth and fifth embodiments of the invention provide a saddle-riding type vehicle equipped with an internal combustion engine that generates driving force to drive a wheel. A fuel tank straddles a vehicle body frame that extends in the anteroposterior direction of the vehicle across the vehicle width direction. A seat has a front end portion situated at a fuel tank central portion. A fuel pump is inside of the fuel tank and supplies fuel to the engine, and is situated anterior to the fuel tank central portion when viewed from a side of the vehicle.

According to the fourth and fifth embodiments, when viewed from a side of the vehicle, the fuel pump is arranged anterior to the central portion of the fuel tank. This is advantageous for off road uses where a rider often moves his body significantly up and down and forward and backward on a seat which continues into a fuel tank, since the fuel pump is not in the area where the fuel tank and the seat overlap. Therefore, the shape of the fuel tank around the area where the tank overlaps can be such that it does not compromise easy handling and foot landing properties which are important for off-road vehicles. That is, a saddle-riding type off-road vehicle can be equipped with a fuel tank while ensuring its easy handling and foot landing properties.

In the fourth and fifth embodiments, the longitudinal direction of the fuel pump is preferably along the top and bottom direction of the vehicle. The fuel pump preferably has a pump section that pumps out fuel and a motor section that rotates around the pump section, wherein the pump section and motor section are adjacent along the direction of the rotation axis of the motor section, and the longitudinal direction of the fuel pump is along the direction of said rotation axis.

At least a part of the vehicle body frame is preferably provided above the engine, and the top end section of the fuel pump is preferably provided below the top end portion of the vehicle body frame.

An exhaust pipe coupled with the engine is preferably provided on a side of the vehicle opposite that of the fuel pump. Conversely, a side stand is preferably provided on the same side as the fuel pump.

Cylinder cowlings that guide a traveling air stream into an inside portion of the vehicle in the vehicle width direction may be provided, wherein the cylinder cowlings extend diagonally toward the front from side sections of the fuel tank, and the fuel pump is inside of the cylinder cowlings in the vehicle width direction.

An outlet to eject fuel is preferably provided at a bottom surface of the fuel pump that is situated below the lowest level that fuel inside the fuel tank reaches.

The engine preferably has a roughly cylindrically-shaped piston, and the longitudinal direction of the fuel pump is preferably along a center line of the piston. The engine is preferably a single-cylinder engine which has the piston.

The fourth and fifth embodiments of the invention further define a saddle-riding type vehicle equipped with an internal combustion engine that generates driving force that drives a wheel, and a fuel pump that supplies fuel to the engine. The fuel pump is provided inside the fuel tank and anterior to a fuel tank central portion; and the longitudinal direction of the fuel pump is along a plane that is parallel to a plane containing the anteroposterior direction of the vehicle and the top and bottom direction of the vehicle.

A head pipe is preferably situated anterior to the fuel tank and a down tube extends downward from the head pipe and supports the engine. The longitudinal direction of the fuel pump is preferably along the down tube as viewed from the side of the vehicle. The down tube may have an upper section formed by an upper rod-like member and lower sections formed by two lower rod-like members that branch from the upper rod-like member, wherein the fuel pump is provided at the upper section.

The fuel tank may have a sub fuel tank section that is a separate unit from the fuel tank, wherein the fuel pump is inside of the sub fuel tank.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 is a side view of a two-wheeled motor vehicle according to a first embodiment of the invention.

FIG. 2 is a plan view of a fuel tank of the vehicle of FIG. 1 according to the present invention.

FIG. 3 is a sectional view taken along line 200-200 of the fuel tank of FIG. 2.

FIG. 4 is a sectional view of the fuel tank of FIG. 2.

FIG. 5 is an enlarged partial sectional view of the fuel tank of FIG. 2.

FIG. 6 is a front elevational view of the fuel tank of FIG. 2.

FIG. 7 is a rear view of the fuel tank of FIG. 2.

FIG. 8 is a plan view of a fuel tank fixing member according to the present invention.

FIG. 9 is a perspective view of an exterior fixing member according to the present invention.

FIG. 10 is a side view of a two-wheeled motor vehicle according to a second embodiment of the present invention.

FIG. 11 is a plan view of a fuel tank of the vehicle of FIG. 10 according to the present invention.

FIG. 12 is a sectional view taken along line 210-210 of the fuel tank of FIG. 11.

FIG. 13 is an enlarged partial sectional view of the fuel tank of FIG. 11.

FIG. 14 is a front elevational view of the fuel tank of FIG. 11.

FIG. 15 is a rear view of the fuel tank of FIG. 11.

FIG. 16 is a side view of a two-wheeled motor vehicle according to a third embodiment of the present invention.

FIG. 17 is a sectional view of a fuel tank of the vehicle of FIG. 16 according to the present invention.

FIG. 18 is a an enlarged partial sectional view of the fuel tank of FIG. 17.

FIG. 19 is an enlarged partial sectional view of the fuel tank of FIG. 17, depicting a method of fabricating boss sections according to the present invention.

FIG. 20 is an enlarged partial sectional view of the fuel tank of FIG. 17, depicting a method of fabricating boss sections according to the present invention.

FIG. 21 is an enlarged partial sectional view of the fuel tank of FIG. 17, depicting a method of fabricating boss sections according to the present invention.

FIG. 22 is an enlarged partial sectional view of the fuel tank of FIG. 17, depicting a method of fabricating boss sections according to the present invention.

FIG. 23 is a left side view of a two-wheeled motor vehicle according to a fourth embodiment of the present invention.

FIG. 24 is a right side view of the vehicle of FIG. 23.

FIG. 25 is a detailed side view illustrating an area around a fuel tank of the vehicle of FIG. 23

FIG. 26 is a perspective view of a fuel pump used in the vehicle of FIG. 23.

FIG. 27 is a sectional view taken along line F5-F5 of FIG. 25.

FIG. 28 is a detailed side view illustrating an area around a fuel tank of a two-wheeled motor vehicle according to a fifth embodiment of the present invention.

FIG. 29 is a sectional view taken along line F7-F7 of FIG. 28.

DETAILED DESCRIPTION OF THE INVENTION

Five embodiments of saddle-riding type vehicles according to the present invention are described below with reference to FIGS. 1-29. A first embodiment is depicted in FIGS. 1-9; a second embodiment is depicted in FIGS. 10-15; and a third embodiment is depicted in FIGS. 16-22. Fourth and fifth embodiments particularly suited to saddle-riding type vehicles for off-road use are depicted, respectively, in FIGS. 23-27 and FIGS. 28-29.

In the figures, the same or similar alphanumerical designators are given to the same or similar parts. The figures are frame format views and the depicted size ratios therefore may vary from the actual ratios. Sizes and ratios should be determined by reference to the following description.

Embodiments 1-3 (FIGS. 1-22)

FIG. 1 is a side view of a two-wheeled motor vehicle 1 according to a first embodiment of the invention. FIGS. 2-9 provide a detailed depiction of the fuel tank of the vehicle 1. In the figures, "FWD" indicates a front or forward direction of vehicle travel.

Vehicle 1 includes a vehicle body frame comprising head pipe 2, main frame 3, pivot axis support member 4, seat rail 5 and backstay 6. Main frame 3 is arranged behind head pipe 2 and extends in a front and rear direction. Main frame 3 has an upper side frame section 3a, which extends from above to the rear, and a lower side frame section 3b, which extends from below to the rear. Upper side frame section 3a is an example of the "frame" of the present invention. Rear sections of upper side frame section 3a and lower side frame section 3b are connected by pivot axis support member 4. Seat rail 5 is connected to main frame 3, and backstay 6 is connected between pivot axis support member 4 and a rear end of seat rail 5.

Front forks 7 are mounted below head pipe 2 and have suspension to absorb impacts in the up and down directions. Front wheel 8 is rotatably mounted at the lower ends of front forks 7. Front fender 9 is mounted above front wheel 8. Front cowl 10 is anterior to head pipe 2 and covers the front of head pipe 2. Handlebar 11 is mounted on the upper portion of head pipe 2.

Engine 12 is installed below upper side frame section 3a and includes cylinder section 12a, cylinder head section 12b and cylinder head cover section 12c. Throttle body 13 and fuel injection apparatus 14 are mounted behind engine 12 and supply, respectively, air and fuel to engine 12. An exhaust pipe (not shown) extends from the rear of engine 12 to muffler 15.

Pivot axis 4a of pivot axis support member 4 supports the front edge portion of rear arm 16 in a swingable fashion. Rear wheel 17 is rotatably mounted to the rear edge portion of rear arm 16. In other words, rear wheel 17 is mounted to main frame 3 via rear arm 16 and pivot axis support member 4.

Seat 18 is mounted above seat rail 5. Fuel tank 19 is arranged anterior to seat 18. Fuel tank 19 has a saddle shape and is made of resin.

As shown in FIGS. 3, 6 and 7, fuel tank 19 straddles upper side frame section 3a of main frame 3 and comprises left side tank section 19a, which extends downward on the left side of upper side frame section 3a (facing the travel direction), and right side tank section 19b, which extends downward on the right side of upper side frame section 3a (facing the travel direction). Insert nut sections 19e and 19f are provided in the front portion of upper surface 19d of concave section 19c which is arranged between left side tank section 19a and right side tank section 19b. Screws 120 are screwed into insert nut sections 19e-f to fix a rear portion of resin plate 20, and the front portion of resin plate 20 is fixed on upper side frame section 3a by screw 121 (FIG. 3).

A filler opening 19g covered by cap 21 is provided in the topmost portion of fuel tank 19. Pump insertion opening 19h (FIG. 2) is formed on the upper surface of fuel tank 19 for inserting fuel pump 22 into fuel tank 19. A plurality of insert nut sections 19i are formed around pump insertion opening 19h. As shown in FIGS. 3 and 4, rubber O-ring 23 and resin circular plate member 24 are arranged outside of pump insertion opening 19h. Cap 25, which is a steel plate, is arranged above circular plate member 24 and O-ring 23. Cap 25 presses circular plate member 24 and O-ring 23 against the outside portion of pump insertion opening 19h and is fixed thereon by screws 122 screwed into insert nut sections 19i.

Hook section 19j is formed adjacent the rear edge portion of the upper surface of fuel tank 19. Catch section 26a of fuel tank fixing member 26 (FIG. 8) engages hook section 19j. As shown in FIG. 8, fuel tank fixing member 26 comprises metal catch sections 26a and 26b and rubber connecting section 26c. As shown in FIG. 3, catch section 26b engages hook section 3c of upper side frame section 3a to fix the rear portion of fuel tank 19 on main frame 3.

Left side tank section 19a and right side tank section 19b are narrower in their lower portions (FIG. 6). Bottom surface 19k of right side tank section 19b is lower than bottom surface 19l of left side tank section 19a. Bottom surfaces 19l and 19k of the tank sections slope downward towards the front (FIG. 3).

Pump support member 27, and fuel pump 22 held therein, are fixed adjacent the front edge (lowermost) portion of bottom surface 19k of right side tank section 19b. Pump support member 27 is made of resin and has a filter 27b at a fuel suction opening 27a. Fixing member 27c is formed integrally with the lower side of pump support member 27 (FIG. 4).

Insert bolts 27d are provided below fixing member 27c. Bolts 27d are screwed into nuts 123 and sandwich bottom surface 19k of right side tank section 19b and exterior fixing member 28 (FIG. 3). Exterior fixing member 28 is one example of a "first exterior fixing member" according to the present invention. Fuel path section 28a is formed inside exterior fixing member 28 (FIG. 9). Fuel path section 28a is one example of a "first fuel path section" according to the present invention. One end section 29a of return piping member 29 is connected to exterior fixing member 28 (FIG. 3). Return piping member 29 returns excess fuel supplied to fuel injection apparatus 14 (FIG. 1) to fuel tank 19.

Fuel path sections 19m and 27e are formed, respectively, in portions of tank section bottom surface 19k and fixing member 27c corresponding to fuel path section 28a of exterior fixing member 28 (FIG. 5). Fuel passing through fuel path section 28a is returned to fuel tank 19 via fuel path sections 19m and 27e.

One end section 30a of inside piping member 30 and one end 31a of inside electrical wiring 31 are connected to fuel pump 22 (FIGS. 3 and 7). Inside piping member 30 is one example of a "first piping member" according to the present invention, and inside electrical wiring 31 is one example of an "electrical wiring" according to the present invention. The other end section 30b of inside piping member 30 is connected to piping member connection section 32a of sealing member 32. The other end 31b of electrical wiring 31 is connected to exterior connector member 32b of sealing member 32 via inside connector member 33.

Sealing member 32 is mounted in flat surface section 19n of the rear portion of fuel tank 19, a predetermined distance from fuel pump 22 (FIG. 3). Ejection opening 19o is formed on flat surface section 19n (FIG. 4). Sealing member 32 is fixed by screws 124 screwed into insert nut sections 19p (FIG. 3). Thus, the spaces between ejection opening 19o and piping member connection section 32a, and between ejection opening 19o and exterior connector member 32b, are sealed. Preferably, piping member connection section 32a and exterior connector section 32b of sealing member 32 are formed in an integrated fashion.

One end section 34a of outside piping member 34 is connected to piping member connection section 32a. The other end section 34b of outside piping member 34 is connected to fuel injection apparatus 14 (FIG. 1).

One end 35a of outside electrical wiring 35 is connected to exterior connector member 32b of sealing member 32 (FIG. 3). The other end 35b of outside electrical wiring 35 is connected to a control section 36 arranged below seat 18 (FIG. 1). Control section 36 drives fuel pump 22 while engine 12 is turned on.

As described above, pump support member 27, having fuel pump 22 therein, is fixed on bottom surface 19k of right side tank section 19b, thereby preventing damage to fuel pump 22 and pump support member 27 by collisions with the inner surface of fuel tank 19 due to vibrations during travel and the like. Furthermore, since fuel pump 22 is fixed it cannot move and does not have difficulty in sucking in fuel, even when the fuel level in tank 19 is low. In this way, fuel inside tank 19 is used effectively.

Since exterior connector section 32b, which is connected to interior connector member 33, is provided in the rear portion of fuel tank 19 a predetermined distance from fuel pump 22, fuel pump 22, interior connector member 33 and exterior connector member 32b can be arranged with predetermined distances. Therefore, fuel pump 22 is easily arranged on bottom surface 19k of right side tank section 19b, which is narrower in its lower portion.

Since sealing member 32 is mounted in flat surface section 19n in the rear portion of fuel tank 19, the spaces between ejection opening 19o and piping member connection section 32a, and between ejection opening 19o and exterior connector member 32b, can be sealed easily. This would not be true if sealing member 32 were mounted in a concave or convex section of fuel tank 19.

Return piping member 29 returns excess fuel supplied to fuel injection apparatus 14. Exterior fixing member 28 is fixed to the exterior of bottom surface 19k of right side tank section 19b, and excess fuel is returned to tank 19 via fuel path section 28a formed in the interior of exterior fixing member 28. The returned excess fuel can be readily sucked in by fuel pump 22 and is thereby effectively used.

FIG. 10 is a side view of a two-wheeled motor vehicle 41 according to a second embodiment of the invention. FIGS. 11-15 provide a detailed depiction of the fuel tank of vehicle 41. The second embodiment of FIGS. 10-15 differs from the first embodiment of FIGS. 1-9 in that a return piping member is not provided, fuel is supplied from a lower portion of the fuel tank to the outside, and an exterior connector member is formed in the rear portion of the fuel tank in an integrated fashion.

As in the first embodiment, fuel pump 22 is mounted within pump support member 67 and fixed in the interior of right side tank section 59b of fuel tank 59 adjacent the front edge (lowermost) portion of bottom surface 59k. Pump support member 67 is made of resin and has filter 67b at fuel suction opening 67a. Fixing member 67c is formed below pump support member 67 in an integral fashion. Fixing member 67c is one example of a "first interior fixing member" according to the present invention. Insert bolts 67d are provided below fixing member 67c and are screwed into nuts 123 to sandwich tank section bottom surface 59k and exterior fixing member 68. Exterior fixing member 68 is one example of a "first exterior fixing member" according to the present invention.

One end section 74a of outside piping member 74 is connected to exterior fixing member 68. The other end section 74b of outside piping member 74 is connected to fuel injection apparatus 14 (FIG. 10).

Fuel path section 68a is formed in the interior of exterior fixing member 68 (FIG. 13). Fuel path section 68a is one example of a "third fuel path section" according to the present invention. Fuel path sections 59m and 67e are formed in portions of bottom surface 59k and fixing member 67c corresponding, respectively, to fuel path section 68a of exterior fixing member 28. Fuel path section 67e is one example of a "second fuel path section" according to the present invention.

One end section 70a of inside piping member 70 is connected to fuel pump 22 (FIGS. 11 and 15). Inside piping member 70 is one example of a "second piping member" according to the present invention. The other end 70b of inside piping member 70 is connected to fuel path section 67e of fixing member 67c. In this way, fuel passing through inside piping member 70 is supplied to the outside from bottom surface 59k of the fuel tank 59 via fuel path sections 59m and 67e (FIG. 13).

One end 31a of inside electrical wiring 31 is connected to fuel pump 22 (FIG. 15). Inside electrical wiring 31 is one example of "electrical wiring" according to the present invention. The other end 31b of inside electrical wiring 31 is connected via interior connector member 33 to exterior connector member 59q, which is formed integrally with flat surface section 59n in the rear portion of fuel tank 59 (FIG. 12).

One end 35a of outside electrical wiring 35 is connected to exterior connector member 59q in the rear portion of fuel tank

59. The other end 35*b* of outside electrical wiring 35 is connected to control section 36 arranged below seat 18 (FIG. 10).

Other parts of vehicle 41 of the second embodiment are formed in the same fashion as in vehicle 1 of the first embodiment, and repeated explanation is therefore omitted for sake of brevity.

Forming exterior connector member 59*q* in the rear portion of fuel tank 59 in an integral fashion is advantageous since it can reduce the number of parts relative to, for example, a case where exterior connector member 59*q* and interior connector member 33 are separately provided.

Furthermore, fuel passing through inside piping member 70 is supplied to the outside from fuel tank 59 via fuel path sections 67*e*, 59*m* and 68*a*. Therefore, less pumping power is required relative to cases where fuel is supplied from the upper portion of the fuel tank. Hence, the pump size can be smaller.

Other advantages of the second embodiment are the same as those of the first embodiment.

FIG. 16 is a side view of a two-wheeled motor vehicle 81 according to a third embodiment of the present invention. FIGS. 16-22 provide a detailed description of the fuel tank of vehicle 81. The third embodiment of FIGS. 16-22 differs from the first and second embodiments in that the fuel tank is mounted to embedded collars of boss sections.

As in the first embodiment, fuel pump 22 within pump support member 107 is fixedly mounted in the interior of right side tank section 99*b* of fuel tank 99 adjacent the front edge (lowermost) portion of bottom surface 99*k*. Pump support member 107 is made of resin and has filter 107*b* at fuel suction opening 107*a*. Fixing member 107*c* is formed below pump support member 107 in an integral fashion (FIG. 18). Insert bolts 107*d* are provided below fixing member 107*c*.

Insert bolts 107*d* are inserted in through holes 99*p* of collars 99*o* of boss sections 99*n* on bottom surface 99*k*. Boss sections 99*n* are formed integrally with bottom surface 99*k* so as to protrude inward. Collars 99*o* have a predetermined length and are concave and convex in shape. Collars 99*o* are embedded in the inside portion of boss sections 99*n* on bottom surface 99*k*. Thus, collars 99*o* are prevented from coming off of boss sections 99*n*. Collar 99*o* is one example of a "second interior fixing member" according to the present invention. Insert bolts 107*d* are screwed into nuts 123 and are thereby fixed on bottom surface 99*k* while sandwiching collars 99 and exterior fixing member 28.

The flatness property of the upper surfaces of collars 99*o* is excellent. This makes it possible to eliminate space between upper surfaces of collars 99*o* and the bottom surface of fixing member 107*c*, thereby preventing fuel leakage through holes 99*p* of collars 99*o*. The excellent flatness property of collars 99*o* facilitates uniform surface pressure of fixing member 107*c* of pump support member 107 against upper surfaces of collars 99*o*. Therefore, damage to fuel tank 99 or fixing member 107*c* and loosening of the fitting of insert bolts 107*d* is prevented. Moreover, as a fuel tank is generally formed with a rotational forming method, it is difficult to form the bottom surface and so forth of the fuel tank with a constant thickness. For this reason, the flatness property of the inner surface of a fuel tank is generally poor. Accordingly, when fixing member 107*c* is mounted directly on bottom surface 99*k* without use of boss sections 99*n* and collars 99*o*, it is likely that the surface pressure of fixing member 107*c* against upper surfaces of collars 99*o* will be non-uniform. This is a disadvantage since bottom surface 99*k* or the bottom surface of fixing member 107*c* may be damaged, and the fitting of insert bolts 107*d* may be loose. Such disadvantages can be eliminated by employing collars 99*o* having an excellent upper surface flatness property.

Fuel path sections 99*m* and 107*f* are formed in portions of bottom surface 99*k* and convex section 107*e* of fixing member 107*c* corresponding, respectively, to fuel path section 28*a* of exterior fixing member 28. In this way, fuel passing through fuel path section 28*a* is retuned to fuel tank 99 via fuel path sections 99*m* and 107*f*.

Other parts of vehicle 81 of the third embodiment are formed in the same fashion as those of the first and second embodiments, and repeated explanation is therefore omitted for sake of brevity.

Boss sections 99*n* protruding inward are provided on bottom surface 99*k* of right side tank section 99*b*. Pump support member 107, which has fuel pump 22 therein, is mounted on collars 99*o* which are embedded inside boss sections 99*n* and have a predetermined length. Therefore, the precision of mounting of pump support member 107 and fuel pump 22 to fuel tank 99 is improved relative to a case where pump support member 107 and fuel pump 22 are mounted directly on the inner surface of fuel tank 99, since the flatness of that inner surface may not be excellent.

Other advantages of the third embodiment are the same as those of the first and second embodiments.

FIGS. 19-22 are sectional views depicting a method of fabricating boss sections 99*n* of fuel tank 99. First, as shown in FIG. 19, collars 99*o* are brought into abutting contact with the portions corresponding to hole sections 130*b* which are formed on the inner surface of metal mold 130 for forming a fuel tank. Then, as shown in FIG. 20, bolts 125, which are made of heat insulating resin, are inserted through holes 99*p* and hole sections 130*b* of metal mold 130, and fixed with nuts 126. Powder resin is then poured into metal mold 130 to constitute fuel tank 99. Then, as shown in FIG. 21, fuel tank 99 is formed by a rotational forming method.

The resin is melted into a liquid state by heating metal mold 130. In that state, metal mold 130 is rotated around an axis extending in a perpendicular direction while it is rotating around an axis extending in a horizontal direction. At this time, the heat insulating resin of bolts 125 (to be inserted through holes 99*p* of collars 99*o*) prevent the resin for tank adhered on bolts 125 from being subjected to high temperatures while metal mold 130 is heated. In this way, the resin adhered on bolts 125 is prevented from melting and covering the head section of bolts 125. In this way, bolts 125 are easily removed from collars 99*o* after metal mold 130 is cooled, and fuel tank 99 as shown in FIG. 22 is formed. Boss sections 99*n*, including collars 99*o* having an excellent flatness property, are provided in an integral fashion at the mounting position for fuel pump 22.

The details of vehicles 1, 41 and 81 described above are provided for exemplary purposes, but should not be perceived as limiting the invention. Various alternatives will be apparent from those of skill in the art and are within the scope of the invention. For example, although the description has been with reference to two-wheeled motor vehicles, the invention could also be applied to other vehicles equipped with fuel pumps such as automobiles, three-wheelers and all terrain vehicles (ATVs).

The bottom surface on which the fuel pump is fixed is described as sloping downward towards the front. However, it could alternatively be formed horizontally or so that it slopes upward towards the front. In this case, the fuel pump would be fixed adjacent to the rear edge (lowermost portion) of the bottom surface. Instead of pulling electrical wiring to the outside from a rear portion of the fuel tank, the electrical wiring could be pulled to the outside from other portions of the fuel tank. Although fuel path sections are described as formed in the fixing members of the pump support member, fuel path sections may not always be formed in the fixing members. The boss sections formed by inserting bolts made of heat insulating resin into through holes of collars could also be formed using bolts made of other heat insulating materials or members other than bolts. When mounting the fuel pump to the collars of the boss sections, return piping may or may not be provided to return excess fuel to the fuel tank.

These are just a few examples of modifications to the examples given herein that are within the scope of the invention.

Embodiments 4 and 5 (FIGS. 23-29)

FIGS. 23-27 depict a two-wheeled saddle-riding type vehicle 110 according to a fourth embodiment of the invention, particularly suited for off-road use (such as, for example, Endure). FIG. 23 is a left side view of vehicle 110, and FIG. 24 is a right side view of vehicle 110. Vehicle 110 is equipped with a front fork 123 rotatably supported by head pipe 121. Front fork 123 supports front wheel 124 and absorbs shock that front wheel 124 receives by movement in an up-and-down direction (in practice, in a direction of a certain caster angle) and according to road conditions. Frame pipe 122 ("vehicle body frame") extends from head pipe 121 which is situated anterior to (towards the front from) fuel tank 130.

As discussed with reference to the previous embodiments, fuel tank 130 straddles an upper part of frame pipe 122. Fuel tank 130 stores fuel (gasoline) that is consumed by internal combustion engine 170 to generate driving force that drives rear wheel 190 ("wheel"). Air scoops 150L and 150R ("cylinder cowlings") are installed in fuel tank 130 and guide a traveling air stream into the inside of vehicle 100 in a vehicle width direction (in the direction of arrow D3 of FIG. 27).

Vehicle 110 is equipped with seat 160 for a rider to sit on. Seat 160 has a shape that continues into fuel tank 130, and a part of seat 160 overlaps fuel tank 130. Exhaust pipe 171 is coupled with engine 170 on the right side of vehicle 110 and is coupled via a catalyst (not shown) with muffler 172 at the right back side portion of vehicle 110 (FIG. 24). A side stand 180 is provided on the left side of vehicle 110 to support vehicle 110 in a standing position (FIG. 23).

Next, a detailed constitution around fuel tank 130 is described. As shown in FIG. 25, frame pipe 122 ("vehicle body frame") extends in an anteroposterior direction of vehicle 110 (in the direction of arrow D1 in FIG. 25). That is, frame pipe 122 extends both in a frontward and rearward direction. A part of frame pipe 122 is situated above engine 170. Engine 170 is a single-cylinder water-cooled 4-cycle engine with a piston 174 that is roughly or approximately cylindrically shaped.

Front end portion 160a of seat 160 is situated at a central portion 130a of fuel tank 130, which is approximately the central portion of fuel tank 130 in the anteroposterior direction of vehicle 110. Air scoop 150L is installed on a side of fuel tank 130 to guide a traveling air stream inside vehicle 110 in a vehicle width direction. In particular, the traveling air stream is guided onto radiator 173 which cools engine 170 with cooling water.

Fuel pump 140 is situated in the interior of fuel tank 130 and supplies fuel to a fuel injection apparatus (not shown), which supplies fuel to engine 170 through fuel hose 131. Fuel pump 140 is situated between fuel tank front end portion 130b and fuel tank central portion 130a, in other words, anterior to (to the front of) fuel tank central portion 130a, when viewed from the left side of vehicle 110.

The longitudinal direction of fuel pump 140 is along a top and bottom direction of vehicle 110 (in the direction of arrow D2 in FIG. 25). In addition, the longitudinal direction of fuel pump 140 is along piston center line L2 that passes through the center of piston 174. Moreover, the longitudinal direction of fuel pump 140 is along a plane P (FIGS. 25 and 27) which is parallel to a plane containing the anteroposterior direction arrow D1 and the top and bottom direction arrow D2.

Fuel pump 140 is situated on the left side of vehicle 110 and exhaust pipe 171 is on the right side of vehicle 110. That is, fuel pump 140 is situated on a side (left side) of vehicle 110 opposite the side on which exhaust pipe 171 is situated (right side). Conversely, side stand 180 is situated on the same side (left side) of vehicle 110 as fuel pump 140.

FIG. 26 is a perspective view of fuel pump 140 in its entirety. Fuel pump 140 is equipped with filter 140a, pump section 140b, regulator 140c, outlet 140d, bottom surface 140e, fuel outlet 140f and motor section 140g. Filter 140a removes impure substances contained in the fuel. Pump section 140b is rotated by motor section 140g and pumps fuel stored in fuel tank 130 out to engine 170 (in particular, to the fuel injection apparatus which is not shown). Regulator 140c regulates the pressure of the fuel, which is pumped out by pump section 140b, in a certain range. Fuel is ejected from fuel outlet 140f on bottom surface 140e through outlet 140d, and is then supplied to engine 170.

Pump section 140b and motor section 140g are provided next to each other along the direction of the rotation axis of motor section 140g, which direction is depicted in FIG. 26 by line D4. Regulator 140c is situated at the top end section of fuel pump 140 below top end portion 122a of frame pipe 122.

FIG. 27 is a sectional view along line F5-F5 in FIG. 25 showing that fuel tank 130 has a saddle shape and straddles frame pipe 122 in the vehicle width direction (directional arrow D3). Air scoops 150L and 150R (cylinder cowlings) extend diagonally towards the front from fuel tank sides 130c and 130d. Fuel pump 140 is situated at the inner sides of cylinder cowlings 150L and 150R in the vehicle width direction. Bottom surface 140e and fuel outlet 140f of fuel pump 140 are situated below the lowest level in fuel tank 130 that fuel reaches (represented by fuel reach line L1).

FIGS. 28 and 29 depict a two-wheeled saddle-riding type vehicle 110A according to a fifth embodiment of the invention, which like vehicle 110 of FIGS. 23-27 is particularly suited for off-road use. In this regard, the constitutions of the right and left sides of vehicle 110A are generally the same as that of vehicle 110. Accordingly, the description below focuses mainly on features of vehicle 110A that differ from vehicle 110 and omits repeat descriptions of features already described with reference to vehicle 110.

Vehicle 110A differs from vehicle 110 primarily in the mounting structure of fuel pump 140. Fuel tank 130 of vehicle 110A has a sub fuel tank 130S (sub fuel tank section) which is a separate unit from fuel tank 130. Fuel tank 130 and sub fuel tank 130S are connected by fuel hose 132 so that fuel injected into fuel tank 130 can flow. Fuel pump 140 is provided inside of sub fuel tank 130S. Breather hoses 133 is connected to the upper part of sub fuel tank 130S and extracts air that accumulates inside of sub fuel tank 130S.

In addition, when compared with engine 170 of vehicle 110, engine 170A of vehicle 110A is not provided with radiator 173. That is, engine 170A is an air-cooled 4-cycle engine. Air scoops 150L and 150R guide a traveling air stream onto cylinder head 175 of engine 170A and others.

As shown in FIG. 28, down tube 125 extends downward from head pipe 121 and supports engine 170A. Down tube 125 comprises upper section 125a and lower sections 125b. Upper section 125a is formed by a rod-like member (upper rod-like member). Lower section 125b is formed by two rod-like members (lower rod-like members) which branch from the rod-like member that forms upper section 125a. Fuel pump 140 is provided on upper section 125a of down tube 125.

In vehicles 110 and 110A, when viewed from the side, fuel pump 140 is situated anterior to fuel tank central portion 130a. In addition, the longitudinal direction of fuel pump 140 is along a plane P that is parallel to a plane containing the anteroposterior direction of the vehicle (arrow D1) and the top and bottom direction of the vehicle (arrow D2). Consequently, even in off-road use when a rider often moves his body significantly up and down and forward and backward on seat 160 that continues into fuel tank 130, one can avoid situating fuel pump 140 in the area where fuel tank 130 and seat 160 overlap with each other.

Therefore, the shape of fuel tank 130 around the area where it overlaps with seat 160 can be such that it does not compromise easy handling and foot landing properties of the vehicle. Thus, the present invention provides an off-road two-wheeled motor vehicle (saddle-riding type vehicle) equipped with a fuel tank while still ensuring easy handling and foot landing properties The longitudinal direction of fuel pump 140 is along the top and bottom direction (in the direction of arrow D2) of vehicle 110 (and 110A). Pump section 140b and motor section 140g are provided next to each other along the direction of the rotation axis of motor section 140g (along line D4). In addition, the longitudinal direction of fuel pump 140 is along the direction of the rotation axis.

For this reason, the size (width) of fuel tank 130 closer to seat 160, in particular, the size (width) of fuel tank 130 on the side closer to seat 160 than to fuel tank central portion 130a, can be kept from becoming larger. Therefore, there is no disturbance in the rider's ability to steer vehicle 110 due to fuel pump 140 or any deterioration of the easy handling and foot landing properties of the vehicle.

A part of frame pipe 122 is provided above engine 170 (170A). In addition, regulator 140c (top end portion) of fuel pump 140 is provided below top end portion 122a of frame pipe 122. Because engine 170 and fuel pump 140, whose weights are relatively heavy, are arranged at the lower side, the center of gravity of vehicle 110 (110A) can be kept low.

Fuel pump 140 is situated on a side (left side) opposite to the side on which exhaust pipe 171 is situated (right side). This is advantageous in that fuel pump 140 is not heated by radiation heat from exhaust pipe 171.

Conversely, fuel pump 140 is on the same side (left side) as side stand 180. Thus, when side stand 180 is supporting vehicle 110, vehicle 110 leans toward the left side. Therefore, even when the remaining fuel in the fuel tank is low, it will be concentrated toward the side of fuel pump 140.

Fuel pump 140 is provided inside air scoops 150L and 150R in the vehicle width direction (direction of arrow D3). In this way, fuel pump 140 is concealed and does not undermine the outer appearance of vehicle 110 (110A).

Bottom surface 140e and fuel outlet 140f of fuel pump 140 are situated below the lowermost level that fuel in tank 130 reaches (fuel reach line L1). Consequently, even when the remaining fuel in tank 130 is very low, it can still be supplied to engine 170 with certainty.

The longitudinal direction of fuel pump 140 is along down tube 125, and fuel pump 140 is provided on upper section 125a of down tube 125. For this reason, protrusion of fuel pump 140 in the vehicle width direction (direction of arrow D3) is suppressed, avoiding compromise of the rider's steering ability and deterioration of easy handling and foot landing properties.

In one embodiment (vehicle 110A), fuel tank 130 has sub fuel tank 130S, which is a separate unit from fuel tank 130. Fuel pump 140 is situated inside of sub fuel tank 130S. This is advantageous as it increases the degree of freedom for layouts of fuel tank 30. In addition, since fuel pump 140 is provided inside sub fuel tank 130S, the fuel in sub fuel tank 130S cools fuel pump 140.

The details of vehicles 110 and 110A described above are provided for exemplary purposes, but should not be perceived as limiting the invention. Various alternatives will be apparent from those of skill in the art and are within the scope of the invention.

For example, while bottom surface 140e and fuel outlet 140f of fuel pump 140 have been described as situated below fuel reach line L1, this need not always be the case. While air scoops 150L and 150R have been described on fuel tank sides 130c and 130d, their installation may not always be required. Fuel pump 140 may be provided on the right side, rather than the left side, of the vehicle. In addition, the longitudinal direction of fuel pump 140 may not necessarily be along the top and bottom (D2) direction of the vehicle. Regulator 140c (top end section) of fuel pump 140 may not always be below top end portion 122a of frame pipe 122. Fuel pump 140 may not always be on upper section 125a of down tube 125, and the longitudinal direction of fuel pump 140 may not always be along down tube 125.

The particular embodiments of the invention described in this document should be considered illustrative, rather than restrictive. Modification to the described embodiments may be made without departing from the spirit of the invention as defined by the following claims.

The invention claimed is:

1. A vehicle comprising:
   a frame extending in a front and a rear direction;
   a fuel tank having a saddle shape and straddling the frame, the fuel tank comprising a left side tank section extending downward on a left side of the frame facing a travel direction and a right side tank section extending downward on a right side of the frame facing the travel direction; and
   a fuel pump mounted inside of the fuel tank for supplying fuel to an engine, wherein
   the fuel pump is fixed in a bottom section adjacent to a front edge section of a lowermost portion of an inside bottom surface that slopes downward toward the front direction of either the left or right side tank section so as not to move, and
   a fuel suction opening is positioned forward of the fuel pump.

2. The vehicle of claim 1, wherein the fuel pump is fixed on a lowermost inside bottom surface of the left or right side tank sections.

3. The vehicle of claim 1, further comprising:
   an electrical wiring with one end mounted to the fuel pump;
   an interior connector member mounted to an other end of the electrical wiring; and
   an exterior connector member connected to the interior connector member and configured in a rear portion of the fuel tank a predetermined distance from the fuel pump.

4. The vehicle of claim 3, further comprising a sealing member including the exterior connector member, wherein the sealing member seals a space between the fuel tank and at least one of the interior connector member and the exterior connector member, and is mounted in a flat surface section in the rear portion of said fuel tank.

5. The vehicle of claim 3, wherein the exterior connector member is integrally formed in the rear portion of the fuel tank.

6. The vehicle of claim 3, further comprising:
a first piping member for supplying fuel to an outside of the fuel tank; and
a sealing member which includes the exterior connector member and a piping member connection section in an integral fashion, and which is mounted to the rear portion of the fuel tank,
wherein one end section of the first piping member is connected to the fuel pump and an other end section of the first piping member is connected to the piping member connection section of the sealing member from inside of the fuel tank, and
wherein fuel passing through the first piping member is supplied to the outside from the rear portion of the fuel tank.

7. The vehicle of claim 6, further comprising:
a return piping member for returning excess fuel to the fuel tank; and
a first exterior fixing member having a first fuel path section and to which the return piping member is connected,
wherein the first exterior fixing member is fixed in an exterior of a bottom surface on which the fuel pump is fixed, and
fuel passing through the return piping member is returned to the fuel tank via the first fuel path section of the first exterior fixing member.

8. The vehicle of claim 1, further comprising:
a first interior fixing member having a second fuel path section, and which mounts the fuel pump to a bottom inside surface of either the left or right side tank section, and
a second piping member for supplying fuel to an outside of the fuel tank,
wherein one end section of the second piping member is connected to the fuel pump,
an other end section of the second piping member is connected to the first interior fixing member, and
fuel passing through the second piping member is supplied to the outside via the second fuel path section of the first interior fixing member.

9. The vehicle of claim 8, further comprising:
a second exterior fixing member which has a third fuel path section connected to the second fuel path section of the first interior fixing member, and which is mounted to an outside bottom surface of the fuel tank,
wherein fuel passing through the second fuel path section of the first interior fixing member is supplied to the outside via the third fuel path section of the second exterior fixing member.

10. The vehicle of claim 1, wherein boss sections protruding inward are provided on the bottom surface of either the left or right side tank section, and
a second interior fixing member which has a predetermined length, and to which the fuel pump is mounted, is mounted in an inner side portion of the boss sections.

11. The vehicle of claim 10, wherein through holes for mounting the fuel pump are provided in the second interior fixing member.

* * * * *